US010397805B2

(12) United States Patent
Hayashi et al.

(10) Patent No.: US 10,397,805 B2
(45) Date of Patent: Aug. 27, 2019

(54) COMMUNICATION DEVICE, COMMUNICATION SYSTEM, AND CONTROL METHOD

(71) Applicant: NEC CORPORATION, Tokyo (JP)

(72) Inventors: Sadafuku Hayashi, Tokyo (JP); Kengo Oketani, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 50 days.

(21) Appl. No.: 15/555,269

(22) PCT Filed: Mar. 22, 2016

(86) PCT No.: PCT/JP2016/001629
§ 371 (c)(1),
(2) Date: Sep. 1, 2017

(87) PCT Pub. No.: WO2016/152140
PCT Pub. Date: Sep. 29, 2016

(65) Prior Publication Data
US 2019/0053073 A1 Feb. 14, 2019

(30) Foreign Application Priority Data
Mar. 25, 2015 (JP) .................................. 2015-061849

(51) Int. Cl.
*H04W 4/00* (2018.01)
*H04W 16/32* (2009.01)
(Continued)

(52) U.S. Cl.
CPC ........... *H04W 16/32* (2013.01); *H04L 1/1614* (2013.01); *H04W 36/02* (2013.01); *H04W 72/04* (2013.01);
(Continued)

(58) Field of Classification Search
None
See application file for complete search history.

(56) References Cited

U.S. PATENT DOCUMENTS 9,967,784 B2 * 5/2018 Kim ................. H04W 36/0055
370/328
2015/0085800 A1 * 3/2015 Sivanesan ............. H04W 76/38
370/329
(Continued)

FOREIGN PATENT DOCUMENTS

EP 2835925 A1 2/2015
JP 2001189959 A 7/2001
(Continued)

OTHER PUBLICATIONS

Communication dated May 29, 2018, issued by the Japanese Patent Office in counterpart Japanese Application No. 2017-507500.
(Continued)

*Primary Examiner* — Anh Vu H Ly
(74) *Attorney, Agent, or Firm* — Sughrue Mion, PLLC

(57) ABSTRACT

In a method for transferring packet data remaining in a first SeNB to a second SeNB via an MeNB, use of a communication line is inefficient. A base station in a communication system that includes a master cell base station, a secondary cell base station, a core network, and a terminal device, wherein: the base station has a reception unit for receiving, from the master cell base station, downlink user data received from the core network by the master cell base station, and a transmission unit for transmitting the downlink user data received to the terminal device; the reception unit receives, from the master cell base station, switching information indicating that the base station from which the master cell base station receives downlink user data is to be switched; and the transmission unit transmits remaining data
(Continued)

to the secondary base station when the reception unit has received the switching information.

10 Claims, 22 Drawing Sheets

(51) Int. Cl.

| | | |
|---|---|---|
| *H04W 36/02* | (2009.01) | |
| *H04W 72/04* | (2009.01) | |
| *H04W 76/12* | (2018.01) | |
| *H04W 76/15* | (2018.01) | |
| *H04W 76/30* | (2018.01) | |
| *H04W 76/27* | (2018.01) | |
| *H04L 1/16* | (2006.01) | |
| *H04W 80/08* | (2009.01) | |

(52) U.S. Cl.
CPC ....... *H04W 72/0446* (2013.01); *H04W 76/12* (2018.02); *H04W 76/15* (2018.02); *H04W 76/27* (2018.02); *H04W 76/30* (2018.02); *H04W 80/08* (2013.01)

(56) References Cited

U.S. PATENT DOCUMENTS

| | | | | | |
|---|---|---|---|---|---|
| 2015/0117183 | A1* | 4/2015 | Heo | ............... | H04W 76/18 370/228 |
| 2015/0312947 | A1* | 10/2015 | Park | ............... | H04L 5/0098 370/329 |
| 2015/0327169 | A1* | 11/2015 | Nigam | ............ | H04W 52/0209 370/311 |
| 2015/0358866 | A1* | 12/2015 | Xu | ................ | H04W 36/00 370/331 |
| 2016/0219475 | A1* | 7/2016 | Kim | ............... | H04L 5/00 370/329 |
| 2016/0227459 | A1* | 8/2016 | Fujishiro | ........ | H04W 16/32 370/328 |
| 2016/0255551 | A1* | 9/2016 | Susitaival | ....... | H04W 36/023 370/334 |
| 2016/0262149 | A1* | 9/2016 | Futaki | ............ | H04W 16/32 370/329 |
| 2017/0013650 | A1* | 1/2017 | Fujishiro | ........ | H04W 88/06 370/328 |
| 2017/0034866 | A1* | 2/2017 | Wager | ............ | H04L 5/0091 370/329 |
| 2017/0041100 | A1* | 2/2017 | Xie | ................ | H04L 1/00 370/328 |
| 2017/0086089 | A1* | 3/2017 | Lee | ................ | H04W 28/0247 370/329 |
| 2017/0111927 | A1* | 4/2017 | Kim | ............... | H04W 28/0278 370/328 |
| 2017/0230867 | A1* | 8/2017 | Hayashi | ......... | H04W 16/32 370/328 |
| 2017/0318508 | A1* | 11/2017 | Berglund | ....... | H04W 36/0072 370/328 |
| 2018/0027456 | A1* | 1/2018 | Nagasaka | ....... | H04W 16/32 370/331 |

FOREIGN PATENT DOCUMENTS

| | | |
|---|---|---|
| JP | 2010-056881 A | 3/2010 |
| WO | 2011/158663 A1 | 12/2011 |
| WO | 2013142361 A1 | 9/2013 |
| WO | 2014/113190 A1 | 7/2014 |

OTHER PUBLICATIONS

Catt, et al., "Mobility signalling flow for dual connectivity", 3GPP TSG RAN WG3#83bis; R3-140639, 3rd Generation Partnership Project; Mar. 30, 2014, vol. RAN WG3, XP050795331, 5 pages.

Huawei, "SeNB Change and Data Forwarding", 3GPP TSG-RAN WG3 Meeting #83bis, R3-140568, 3rd Generation Partnership Project, Mar. 30, 2014, XP050795263, 5 pages.

Communication dated Oct. 22, 2018, issued by the European Patent Office in corresponding European Application No. 16768047.9.

LTE; Evolved Universal Terrestrial Radio Access(E-UTRA) and Evolved Universal Terrestrial Radio Access Network (E-UTRAN); Overall description; Stage 2 (3GPP TS 36.300 version 12.4.0 Release 12); 266 pages.

CMCC; HO signaling flow for small cell enhancement, 3GPP TSG-RAN WG3, R-132227, Nov. 11-15, 2013, 6 pages.

NEC Corporation; CN signalling in scenario 3, 3GPP TSG RAN2 Meeting #83, R2-132673; Aug. 19-23, 2013, 4 pages.

Fujitsu; Initial analysis on the potential impact of Small Cell UP/CP alternatives on RAN3 specs; 3GPP TSG-RAN WG3 #81bis, R3-131755, 4 pages.

International Search Report for PCT/JP2016/001629 dated Jun. 14, 2016 [PCT/ISA/210].

Written Opinion for PCT/JP2016/001629 dated Jun. 14, 2016 [PCT/ISA/237].

Communication dated Aug. 21, 2018 from the Japanese Patent Office in counterpart Application No. 2017507500.

* cited by examiner

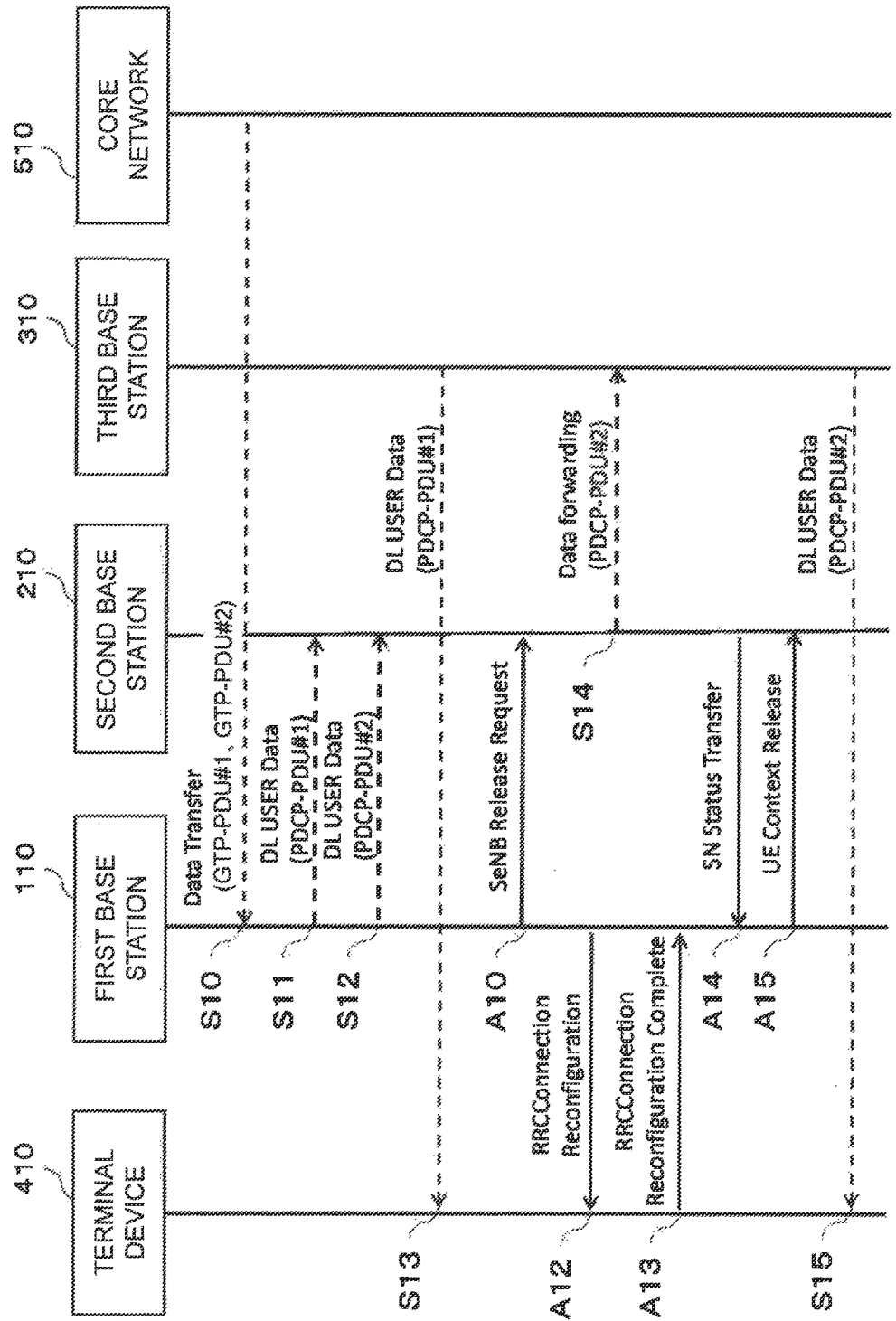

Fig. 10

9.1.1.4 SN STATUS TRANSFER

This message is sent by the source eNB to the target eNB to transfer the uplink/downlink PDCP SN and HFN status during a handover.

Direction: source eNB → target eNB (handover).

eNB from which the E-RAB context is transferred → eNB to which the E-RAB context is transferred (dual connectivity).

| IE/Group Name | Presence | Range | IE type and reference | Semantics description | Criticality | Assigned Criticality |
|---|---|---|---|---|---|---|
| Message Type | M | | 9.2.13 | | YES | ignore |
| Old eNB UE X2AP ID | M | | eNB UE X2AP ID 9.2.24 | Allocated for handover at the source eNB and for dual connectivity at the eNB from which the E-RAB context is transferred | YES | reject |
| New eNB UE X2AP ID | M | | eNB UE X2AP ID 9.2.24 | Allocated for handover at the target eNB and for dual connectivity at the eNB to which the E-RAB context is transferred | YES | reject |
| E-RABs Subject To Status Transfer List | | 1 | | | YES | ignore |
| >E-RABs Subject To Status Transfer Item | | 1 .. <maxnoof Bearers> | | | EACH | ignore |
| >>E-RAB ID | M | | 9.2.23 | | – | – |
| >>Receive Status Of UL PDCP SDUs | O | | BIT STRING (4096) | PDCP Sequence Number = (First Missing SDU Number + bit position) modulo 4096<br><br>0: PDCP SDU has not been received.<br>1: PDCP SDU has been received correctly | – | – |
| >>UL COUNT Value | M | | COUNT Value 9.2.15 | PDCP-SN and Hyper Frame Number of the first missing UL SDU in case of 12 bit long PDCP-SN | – | – |
| >>DL COUNT Value | M | | COUNT Value 9.2.15 | PDCP-SN and Hyper frame number that the target eNB should assign for the next DL SDU not having an SN yet in case of 12 bit long PDCP-SN | – | – |
| >>Receive Status Of UL PDCP SDUs Extended | O | | BIT STRING (1..16384) | The IE is used in case of 15 bit long PDCP-SN in this release.<br>The first bit indicates the status of the SDU after the First Missing UL PDCP SDU.<br>The Nth bit indicates the status of the UL PDCP SDU in position (N + First Missing SDU Number) modulo (1 + the maximum value of the PDCP-SN).<br><br>0: PDCP SDU has not been received.<br>1: PDCP SDU has been received correctly | YES | ignore |
| >>UL COUNT Value Extended | O | | COUNT Value Extended 9.2.66 | PDCP-SN and Hyper Frame Number of the first missing UL SDU in case of 15 bit long PDCP-SN | YES | ignore |
| >>DL COUNT Value Extended | O | | COUNT Value Extended 9.2.66 | PDCP-SN and Hyper Frame Number that the target eNB should assign for the next DL SDU not having an SN yet in case of 15 bit long PDCP-SN | YES | ignore |
| E-RABs Subject To Status Transfer List for Split Bearer | | 1 | | | YES | ignore |
| >E-RABs Subject To Status Transfer Item | | 1 .. <maxnoof Bearers> | | | EACH | ignore |
| >>E-RAB ID | M | | 9.2.23 | | – | – |
| >>Forwarded Status Of DL PDCP PDUs | O | | BIT STRING (4096) | PDCP Sequence Number = (First Forwarded PDU Number + bit position) modulo 4096<br><br>0: PDCP PDU has not been forwarded.<br>1: PDCP PDU has been forwarded correctly | – | – |
| >>DL COUNT Value | M | | COUNT Value 9.2.15 | PDCP-SN and Hyper Frame Number of the first forwarded DL PDU in case of 12 bit long PDCP-SN | – | – |
| >>Forwarded Status Of DL PDCP PDUs Extended | O | | BIT STRING (1..16384) | The IE is used in case of 15 bit long PDCP-SN in this release.<br>The first bit indicates the status of the PDU after the First Forwarded DL PDCP PDU.<br>The Nth bit indicates the status of the DL PDCP PDU in position (N + First Forwarded PDU Number) modulo (1 + the maximum value of the PDCP-SN).<br><br>0: PDCP PDU has not been forwarded.<br>1: PDCP PDU has been forwarded correctly | YES | ignore |
| >>DL COUNT Value Extended | O | | COUNT Value Extended 9.2.66 | PDCP-SN and Hyper Frame Number of the first forwarded DL PDU in case of 15 bit long PDCP-SN | YES | ignore |

| Range bound | Explanation |
|---|---|
| maxnoofBearers | Maximum no. of E-RABs. Value is 256. |

Fig. 11

9.1.1.4 SN STATUS TRANSFER

This message is sent by the source eNB to the target eNB to transfer the uplink/downlink PDCP SN and HFN status during a handover.

Direction: source eNB → target eNB (handover),
eNB from which the E-RAB context is transferred → eNB to which the E-RAB context is transferred (dual connectivity).

| IE/Group Name | Presence | Range | IE type and reference | Semantics description | Criticality | Assigned Criticality |
|---|---|---|---|---|---|---|
| Message Type | M | | 9.2.13 | | YES | ignore |
| Old eNB UE X2AP ID | M | | eNB UE X2AP ID 9.2.24 | Allocated for handover at the source eNB and for dual connectivity at the eNB from which the E-RAB context is transferred | YES | reject |
| New eNB UE X2AP ID | M | | eNB UE X2AP ID 9.2.24 | Allocated for handover at the target eNB and for dual connectivity at the eNB to which the E-RAB context is transferred | YES | reject |
| E-RABs Subject To Status Transfer List | | 1 | | | YES | ignore |
| >E-RABs Subject To Status Transfer Item | | 1 .. <maxnoof Bearers> | | | EACH | ignore |
| >>E-RAB ID | M | | 9.2.23 | | – | – |
| >>Receive Status Of UL PDCP SDUs | O | | BIT STRING (4096) | PDCP Sequence Number = (First Missing SDU Number + bit position) modulo 4096<br><br>0: PDCP SDU has not been received.<br>1: PDCP SDU has been received correctly. | – | – |
| >>UL COUNT Value | M | | COUNT Value 9.2.15 | PDCP-SN and Hyper Frame Number of the first missing UL SDU in case of 12 bit long PDCP-SN | – | – |
| >>DL COUNT Value | M | | COUNT Value 9.2.15 | PDCP-SN and Hyper frame number that the target eNB should assign for the next DL SDU not having an SN yet in case of 12 bit long PDCP-SN | – | – |
| >>Receive Status Of UL PDCP SDUs Extended | O | | BIT STRING (1..16384) | The IE is used in case of 15 bit long PDCP-SN in this release<br>The first bit indicates the status of the SDU after the First Missing UL PDCP SDU.<br>The Nth bit indicates the status of the UL PDCP SDU in position (N + First Missing SDU Number) modulo (1 + the maximum value of the PDCP-SN).<br><br>0: PDCP SDU has not been received.<br>1: PDCP SDU has been received correctly. | YES | ignore |
| >>UL COUNT Value Extended | O | | COUNT Value Extended 9.2.66 | PDCP-SN and Hyper Frame Number of the first missing UL SDU in case of 15 bit long PDCP-SN | YES | ignore |
| >>DL COUNT Value Extended | O | | COUNT Value Extended 9.2.66 | PDCP-SN and Hyper Frame Number that the target eNB should assign for the next DL SDU not having an SN yet in case of 15 bit long PDCP-SN | YES | ignore |
| E-RABs Subject To Status Transfer List for Split Bearer | | 1 | | | YES | ignore |
| >E-RABs Subject To Status Transfer Item | | 1 .. <maxnoof Bearers> | | | EACH | ignore |
| >>E-RAB ID | M | | 9.2.23 | | – | – |
| >>Forwarded Status Of UL PDCP PDUs | O | | BIT STRING (4096) | PDCP Sequence Number = (First Forwarded PDU Number + bit position) modulo 4096<br><br>0: PDCP PDU has not been forwarded.<br>1: PDCP PDU has been forwarded correctly. | – | – |
| >>UL COUNT Value | M | | COUNT Value 9.2.15 | PDCP-SN and Hyper Frame Number of the first forwarded UL PDU in case of 12 bit long PDCP-SN | – | – |
| >>Forwarded Status Of UL PDCP PDUs Extended | O | | BIT STRING (1..16384) | The IE is used in case of 15 bit long PDCP-SN in this release.<br>The first bit indicates the status of the PDU after the First Forwarded UL PDCP PDU.<br>The Nth bit indicates the status of the UL PDCP PDU in position (N + First Forwarded PDU Number) modulo (1 + the maximum value of the PDCP-SN).<br><br>0: PDCP PDU has not been forwarded.<br>1: PDCP PDU has been forwarded correctly. | YES | ignore |
| >>UL COUNT Value Extended | O | | COUNT Value Extended 9.2.66 | PDCP-SN and Hyper Frame Number of the first forwarded UL PDU in case of 15 bit long PDCP-SN | YES | ignore |

| Range bound | Explanation |
|---|---|
| maxnoofBearers | Maximum no. of E-RABs. Value is 256. |

Fig. 12

8.1.1.4 SN STATUS TRANSFER

This message is sent by the source eNB to the target eNB to transfer the uplink/downlink PDCP SN and HFN status during a handover.

Direction: source eNB → target eNB (handover).
eNB from which the E-RAB context is transferred → eNB to which the E-RAB context is transferred (dual connectivity).

| IE/Group Name | Presence | Range | IE type and reference | Semantics description | Criticality | Assigned Criticality |
|---|---|---|---|---|---|---|
| Message Type | M | | 9.2.13 | | YES | ignore |
| Old eNB UE X2AP ID | M | | eNB UE X2AP ID 9.2.24 | Allocated for handover at the source eNB and for dual connectivity at the eNB from which the E-RAB context is transferred | YES | reject |
| New eNB UE X2AP ID | M | | eNB UE X2AP ID 9.2.24 | Allocated for handover at the target eNB and for dual connectivity at the eNB to which the E-RAB context is transferred | YES | reject |
| E-RABs Subject To Status Transfer List | | 1 | | | YES | ignore |
| >E-RABs Subject To Status Transfer Item | | 1 .. <maxnoof Bearers> | | | EACH | ignore |
| >>E-RAB ID | M | | 9.2.23 | | – | – |
| >>Receive Status Of UL PDCP SDUs | O | | BIT STRING (4096) | PDCP Sequence Number = (First Missing SDU Number + bit position) modulo 4096<br><br>0: PDCP SDU has not been received.<br>1: PDCP SDU has been received correctly. | – | – |
| >>UL COUNT Value | M | | COUNT Value 9.2.15 | PDCP-SN and Hyper Frame Number of the first missing UL SDU in case of 12 bit long PDCP-SN | – | – |
| >>DL COUNT Value | M | | COUNT Value 9.2.15 | PDCP-SN and Hyper frame number that the target eNB should assign for the next DL SDU not having an SN yet in case of 12 bit long PDCP-SN | – | – |
| >>Receive Status Of UL PDCP SDUs Extended | O | | BIT STRING (1..16384) | The IE is used in case of 15 bit long PDCP-SN in this release.<br>The first bit indicates the status of the SDU after the First Missing UL PDCP SDU.<br>The N$^{th}$ bit indicates the status of the UL PDCP SDU in position (N + First Missing SDU Number) modulo (1 + the maximum value of the PDCP-SN).<br><br>0: PDCP SDU has not been received.<br>1: PDCP SDU has been received correctly. | YES | ignore |
| >>UL COUNT Value Extended | O | | COUNT Value Extended 9.2.66 | PDCP-SN and Hyper Frame Number of the first missing UL SDU in case of 15 bit long PDCP-SN | YES | ignore |
| >>DL COUNT Value Extended | O | | COUNT Value Extended 9.2.66 | PDCP-SN and Hyper Frame Number that the target eNB should assign for the next DL SDU not having an SN yet in case of 15 bit long PDCP-SN | YES | ignore |
| E-RABs Subject To Status Transfer List for Split Bearer | | 1 | | | YES | ignore |
| >E-RABs Subject To Status Transfer Item | | 1 .. <maxnoof Bearers> | | | EACH | ignore |
| >>E-RAB ID | M | | 9.2.23 | | – | – |
| >>Forwarded Status Of DL PDCP PDUs | O | | BIT STRING (4096) | PDCP Sequence Number = (First Forwarded PDU Number + bit position) modulo 4096<br><br>0: PDCP PDU has not been forwarded.<br>1: PDCP PDU has been forwarded correctly. | – | – |
| >> DL X2-UP SN | O | | INTEGER (0..65535) | X2-UP SN of the first forwarded DL PDU | YES | ignore |

| Range bound | Explanation |
|---|---|
| maxnoofBearers | Maximum no. of E-RABs. Value is 256 |

Fig. 13

9.1.1.4 SN STATUS TRANSFER
This message is sent by the source eNB to the target eNB to transfer the uplink/downlink PDCP SN and HFN status during a handover.
Direction: source eNB → target eNB (handover).
eNB from which the E-RAB context is transferred → eNB to which the E-RAB context is transferred (dual connectivity).

| IE/Group Name | Presence | Range | IE type and reference | Semantics description | Criticality | Assigned Criticality |
|---|---|---|---|---|---|---|
| Message Type | M | | 9.2.13 | | YES | ignore |
| Old eNB UE X2AP ID | M | | eNB UE X2AP ID 9.2.24 | Allocated for handover at the source eNB and for dual connectivity at the eNB from which the E-RAB context is transferred | YES | reject |
| New eNB UE X2AP ID | M | | eNB UE X2AP ID 9.2.24 | Allocated for handover at the target eNB and for dual connectivity at the eNB to which the E-RAB context is transferred | YES | reject |
| E-RABs Subject To Status Transfer List | | 1 | | | YES | ignore |
| >E-RABs Subject To Status Transfer Item | | 1 .. <maxnoof Bearers> | | | EACH | ignore |
| >>E-RAB ID | M | | 9.2.23 | | - | - |
| >>Receive Status Of UL PDCP SDUs | O | | BIT STRING (4096) | PDCP Sequence Number = (First Missing SDU Number + bit position) modulo 4096

0: PDCP SDU has not been received.
1: PDCP SDU has been received correctly. | - | - |
| >>UL COUNT Value | M | | COUNT Value 9.2.15 | PDCP-SN and Hyper Frame Number of the first missing UL SDU in case of 12 bit long PDCP-SN | - | - |
| >>DL COUNT Value | M | | COUNT Value 9.2.15 | PDCP-SN and Hyper frame number that the target eNB should assign for the next DL SDU not having an SN yet in case of 12 bit long PDCP-SN | - | - |
| >>Receive Status Of UL PDCP SDUs Extended | O | | BIT STRING (1..16384) | The IE is used in case of 15 bit long PDCP-SN in this release.
The first bit indicates the status of the SDU after the First Missing UL PDCP SDU.
The N<sup>th</sup> bit indicates the status of the UL PDCP SDU in position (N + First Missing SDU Number) modulo (1 + the maximum value of the PDCP-SN).

0: PDCP SDU has not been received.
1: PDCP SDU has been received correctly. | YES | ignore |
| >>UL COUNT Value Extended | O | | COUNT Value Extended 9.2.66 | PDCP-SN and Hyper Frame Number of the first missing UL SDU in case of 15 bit long PDCP-SN | YES | ignore |
| >>DL COUNT Value Extended | O | | COUNT Value Extended 9.2.66 | PDCP-SN and Hyper Frame Number that the target eNB should assign for the next DL SDU not having an SN yet in case of 15 bit long PDCP-SN | YES | ignore |
| E-RABs Subject To Status Transfer List for Split Bearer | | 1 | | | YES | ignore |
| >E-RABs Subject To Status Transfer Item | | 1 .. <maxnoof Bearers> | | | EACH | ignore |
| >>E-RAB ID | M | | 9.2.23 | | - | - |
| >>Forwarded Status Of UL PDCP PDUs | O | | BIT STRING (4096) | PDCP Sequence Number = (First Forwarded PDU Number + bit position) modulo 4096

0: PDCP PDU has not been forwarded.
1: PDCP PDU has been forwarded correctly. | - | - |
| >> UL X2-UP SN | O | | INTEGER (0..65535..) | X2-UP SN of the first forwarded UL PDU | YES | ignore |

| Range bound | Explanation |
|---|---|
| maxnoofBearers | Maximum no. of E-RABs. Value is 256. |

Fig. 14

5.5.2.x  Forwarding Status (PDU Type 2)
This frame format is defined for the SeNB inform to the MeNB or target SeNB the data forwarding status of SeNB.
The following shows the respective FORWARDING STATUS frame.

| | | | Bits | | | | | Number of Octets |
|---|---|---|---|---|---|---|---|---|
| 7 | 6 | 5 | 4 | 3 | 2 | 1 | 0 | |
| PDU Type (=2) | | | | spare | | UL | DL | 1 |
| First forwarded DL X2-U Sequence Number | | | | | | | | 2 |
| DL X2-U Sequence Number bitmap | | | | | | | | 1-8191 |
| Spare extension | | | | | | | | 0-4 |

Fig. 15

5.5.2.x  Forwarding Status (PDU Type 2)
This frame format is defined for the SeNB inform to the MeNB or target SeNB the data forwarding status of SeNB. The following shows the respective FORWARDING STATUS frame.

| Bits | | | | | | | | Number of Octets |
|---|---|---|---|---|---|---|---|---|
| 7 | 6 | 5 | 4 | 3 | 2 | 1 | 0 | |
| PDU Type (=2) | | | | spare | | UL | DL | 1 |
| First forwarded UL X2-U Sequence Number | | | | | | | | 2 |
| UL X2-U Sequence Number bitmap | | | | | | | | 1-8191 |
| Spare extension | | | | | | | | 0-4 |

Fig. 16

5.5.2.x Forwarding Status (PDU Type 2)
This frame format is defined for the SeNB inform to the MeNB or target SeNB the data forwarding status of SeNB. The following shows the respective FORWARDING STATUS frame.

| Bits | | | | | | | | Number of Octets |
|---|---|---|---|---|---|---|---|---|
| 7 | 6 | 5 | 4 | 3 | 2 | 1 | 0 | |
| PDU Type (=2) | | | | spare | | UL | DL | 1 |
| First forwarded DL X2-U Sequence Number ||||||||  2 |
| DL X2-U Sequence Number bitmap |||||||| 1-8191 |
| First forwarded UL X2-U Sequence Number |||||||| 2 |
| UL X2-U Sequence Number bitmap |||||||| 1-8191 |
| Spare extension |||||||| 0-4 |

COMMUNICATION DEVICE, COMMUNICATION SYSTEM, AND CONTROL METHOD

This application is a National Stage of International Application No. PCT/JP2016/001629 filed Mar. 22, 2016, claiming priority based on Japanese Patent Application No. 2015-061849, filed Mar. 25, 2015, the contents of all of which are incorporated herein by reference in their entirety.

TECHNICAL FIELD

The present invention relates to a communication device, a communication system, and a control method in a radio communication network.

BACKGROUND ART

The 3GPP (3rd Generation Partnership Project) has established an EUTRAN (Evolved UMTS Terrestrial Radio Access Network) (UMTS: Universal Mobile Telecommunications System) network that is referred to as Dual Connectivity, in which packet data are transmitted and received between two eNBs (eNode Bs) and a UE (User Equipment).

FIG. 18 illustrates an example of a configuration of a wireless communication system implementing Dual Connectivity.

The wireless communication system illustrated in FIG. 18 includes a UE 1, an MeNodeB (Master eNode B. Hereinafter, written as MeNB) 2, an SeNodeB (Secondary eNode B. Hereinafter, written as SeNB) 3, an MME (Mobility Management Entity) 4, and an S-GW (Serving Gateway) 5.

The MeNB 2 is a master cell base station.

The SeNB 3 is a secondary cell base station. Note that a cell (SCG: Secondary Cell Group) under control of the SeNB 3 is located within a coverage area of a cell (MCG: Master Cell Group) under control of the MeNB 2.

The UE 1 is a terminal device that receives DL (Down-Link) packet data from the MeNB 2 and the SeNB 3. Note that the UE 1 transmits UL (UpLink) packet data to only the MeNB 2, or to the MeNB 2 and the SeNB 3.

The MME 4 is a core network device arranged in a CN (Core Network), and manages C (Control)-plane transmission and movement of the UE 1.

The S-GW 5 is a core network device arranged in the CN, and transmits U (User)-plane packet data.

Note that the MeNB 2 is connected with the SeNB 3 through an X2 Interface, and the MME 4 and the S-GW 5 are connected with the MeNB 2 and the SeNB 3 through an S1 Interface.

FIG. 19 illustrates an example of a C-plane connection configuration in Dual Connectivity.

C-plane connection is made as illustrated in FIG. 19. Connection of the UE 1 in a connection state of Dual Connectivity is only S1-MME between the MeNB 2 and the MME 4. In addition, RRC (Radio Resource Control) Connection of the UE 1 is present also only in a wireless section between the UE 1 and the MeNB 2. In other words, no RRC Connection is present in at least a wireless section between the UE 1 and the SeNB 3. However, the SeNB 3 may create signal information relevant to an RRC message for the UE 1, and may transmit the created signal information to the UE 1 via the MeNB 2.

In addition, examples of a U-plane connection configuration in Dual Connectivity include a Split bearer option configuration and an SCG bearer option configuration.

FIG. 20 illustrates an example of a U-plane connection configuration for the Split bearer option configuration, and FIG. 21 illustrates an example of a Radio Protocol connection configuration for the Split bearer option configuration.

As illustrated in FIGS. 20 and 21, in the case of the Split bearer option configuration, U-plane DL packet data are transmitted from the S-GW 5 to only the MeNB 2, but are not transmitted to the SeNB 3. Note that, in the configurations in FIGS. 20 and 21, a bearer from the MeNB 2 to the UE 1 is referred to as an MCG bearer, and a bearer from the SeNB 3 to the UE 1 is referred to as an SCG bearer.

As illustrated in FIG. 21, each of the UE 1, the MeNB 2, and the SeNB 3 has a layer configuration that is composed of a PDCP (Pacet Data Convergence Protocol) layer, an RLC (Radio Link Control) layer, and a MAC (Medium Access Control) layer.

In the MeNB 2, U-plane DL packet data received from the S-GW 5 are accepted on the PDCP layer. Herein, one PDCP layer (a right-side layer in FIG. 21) of the MeNB 2 can transmit certain part of packet data (PDCP PDU (Protocol Data Unit)) to the UE 1 via a cell under control of its own, and can transmit certain part of packet data (PDCP PDU) to the UE 1 via the SeNB 3. In other words, in the PDCP layer of the MeNB 2, U-plane packet data can be split.

Incidentally, in a wireless communication system implementing Dual Connectivity, an MeNB may change an SeNB (Source SeNB) with which the MeNB is connected, to another SeNB (Target SeNB), along with addition and deletion of an SeNB. This is a technique called SeNB Change. When SeNB Change is performed, a Source SeNB is required to transfer packet data remaining in the Source SeNB to another device.

NPL 1 prescribes that, when SeNB Change is performed in the case of the Split bearer option configuration, packet data remaining in a Source SeNB are transferred to an MeNB. The packet data transferred from the Source SeNB to the MeNB are thereafter transferred from the MeNB to a Target SeNB.

CITATION LIST

Patent Literature

[PTL 1] International Publication WO 2011/158663

Non Patent Literature

[NPL 1] 3GPP TS 36.300 v12.4.0 (2015-01)

SUMMARY OF INVENTION

Technical Problem

However, a method of transferring packet data remaining in a Source SeNB to a Target SeNB via an MeNB has a problem that use of a communication line is inefficient, since a communication resource between the Source SeNB and the MeNB, and a communication resource between the MeNB and the Target SeNB, are used.

In view of the above, one object to be accomplished by example embodiments disclosed herein is to provide a base station, a communication system, a method, and the like that enable transmission of packet data remaining in a second base station (Source SeNB) from the second base station (Source SeNB) to a third base station (Target SeNB), even not necessarily via a first base station (MeNB).

Solution to Problem

A base station according to the present example embodiment is the base station in a communication system that includes a master cell base station, a secondary cell base station, a core network, and a terminal device, the base station comprises:

a reception unit that receives, from the master cell base station, downlink user data received from the core network by the master cell base station; and a transmission unit that transmits, to the terminal device, downlink user data received by the reception unit, wherein the reception unit receives, from the master cell base station, switching information indicating that a base station from which the master cell base station receives downlink user data is switched, and the transmission unit transmits remaining data to the secondary cell base station when the reception unit receives the switching information.

A method of a second base station according to the present example embodiment is the method of the second base station in a communication system that includes a master cell base station, a secondary cell base station, a core network, and a terminal device, the method comprises:

receiving, from the master cell base station, downlink user data received from the core network by the master cell base station; and transmitting, to the terminal device, downlink user data received by the reception unit, wherein the reception unit receives, from the master cell base station, switching information indicating that a base station from which the master cell base station receives downlink user data is switched, and the transmission unit transmits remaining data to the secondary cell base station when the reception unit receives the switching information.

A base station according to the present example embodiment is the base station in a communication system that comprises a master cell base station, a secondary cell base station, a core network, and a terminal device, the base station comprises:

a reception unit that receives, from the master cell base station, downlink user data received from the core network by the master cell base station; and a transmission unit that transmits, to the terminal device, downlink user data received by the reception unit, wherein the reception unit receives data remaining in the secondary cell base station from the secondary cell base station.

Advantageous Effects of Invention

The above-described example embodiments enable transmission of data remaining in a second base station 200 from the second base station 200 to a third base station 300, even not necessarily via a first base station 100.

BRIEF DESCRIPTION OF DRAWINGS

FIG. 9 is a sequence diagram illustrating an example of operation of a communication system according to the second example embodiment.

FIG. 10 is an example in which transmission status information is included in an SN Status Transfer message.

FIG. 11 is an example in which transmission status information is included in an SN Status Transfer message.

FIG. 12 is an example in which transmission status information is included in an SN Status Transfer message.

FIG. 13 is an example in which transmission status information is included in an SN Status Transfer message.

FIG. 14 is an example in which transmission status information is included in a Forwarding Status frame.

FIG. 15 is an example in which transmission status information is included in a Forwarding Status frame.

FIG. 16 is an example in which transmission status information is included in a Forwarding Status frame.

DESCRIPTION OF EMBODIMENTS

Figure 1:
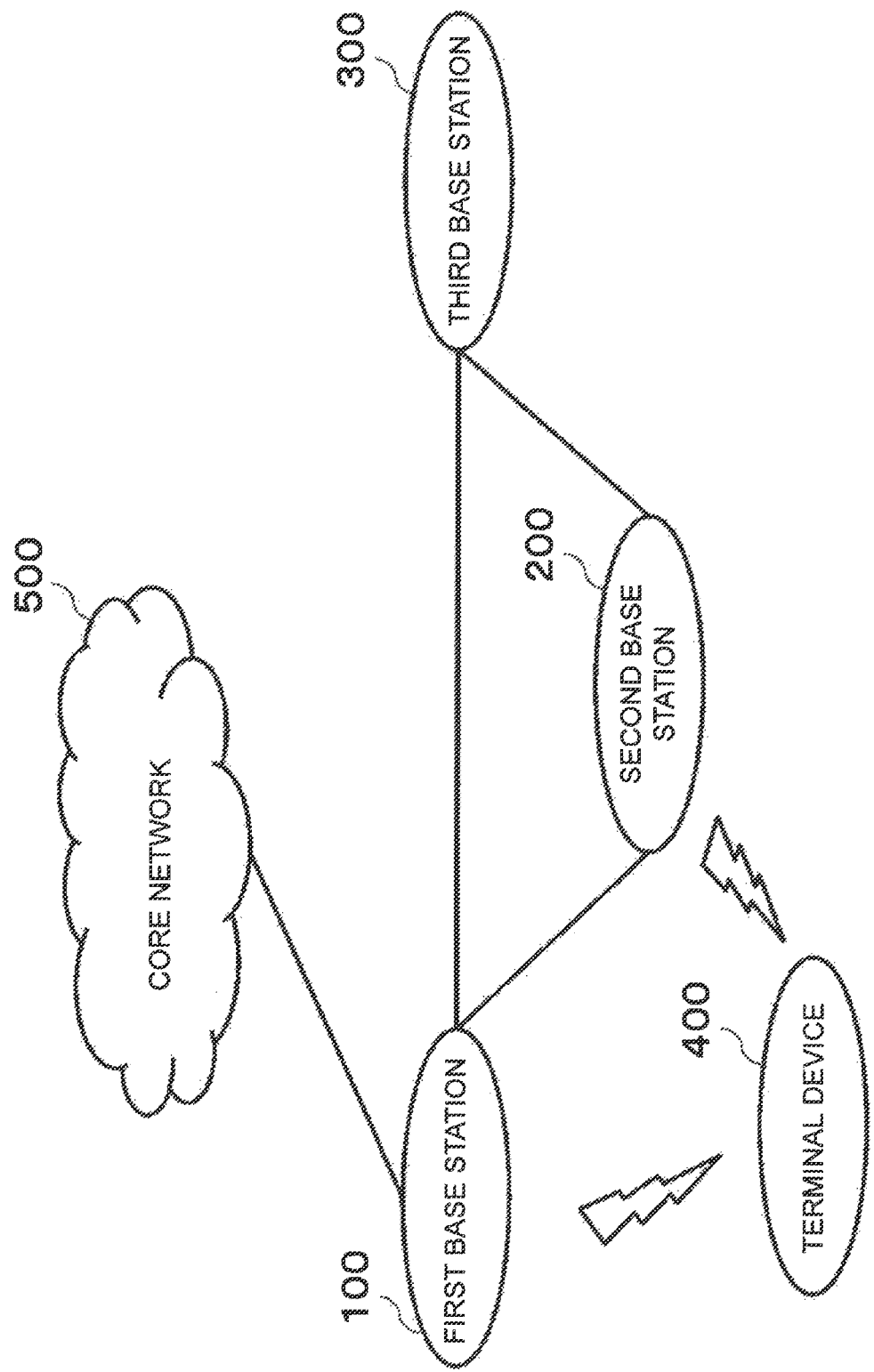
FIG. 1 is a configuration diagram of a communication system according to a first example embodiment.

Specific example embodiments will be described below in detail with reference to the drawings. The same or corresponding elements are assigned with the same reference numerals throughout the drawings, and repeated descriptions therefor will be omitted as needed for clarification of explanation.

A plurality of example embodiments described below can be carried out independently, or can be carried out in combination as appropriate. The plurality of example embodiments have mutually different novel features. Accordingly, the plurality of example embodiments contribute to solving mutually different objects or problems, and contribute to exhibiting mutually different advantageous effects.

First Example Embodiment

FIG. 1 illustrates a configuration example of a communication system according to the present example embodiment. The communication system provides a communication service, for example, voice communication or packet data communication, or both of voice communication and packet data communication. Referring to FIG. 1, the communication system includes a first base station 100, a second base station 200, a third base station 300, a terminal device 400, and a core network 500.

The first base station 100 transmits and receives downlink data and uplink data to and from the core network 500. Herein, downlink data and uplink data include one or both of a control signal and user data. In addition, the first base station 100 transmits, to the second base station 200, all or part of downlink user data received from the core network 500.

The second base station 200 transmits, to the terminal device 400, downlink user data received from the first base station 100. In addition, the second base station 200 can transmit, to the first base station 100, uplink user data received from the terminal device 400.

The second base station 200 and the third base station 300 are not connected with the core network 500.

The terminal device 400 receives downlink user data from the first base station 100 and the second base station 200.

Figure 2:
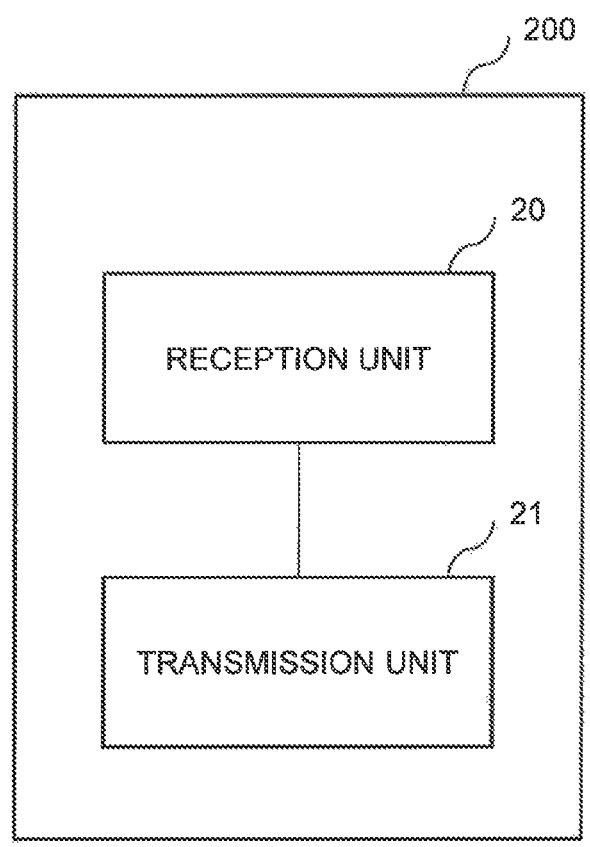
FIG. 2 is a block diagram of a second base station according to the first example embodiment.

FIG. 2 illustrates an example of a configuration of the second base station 200 according to the present example embodiment.

The second base station 200 includes at least a reception unit 20 and a transmission unit 21.

The reception unit 20 receives, from the first base station 100, all or part of downlink user data received from the core network 500 by the first base station 100.

The transmission unit 21 transmits, to the terminal device 400, downlink user data received by the reception unit 20. In addition, when a base station for transmitting, to the terminal device 400, all or part of downlink user data received from the core network 500 by the first base station 100 (hereinafter, referred to as a base station for the terminal device 400) is changed from the second base station 200 to the third base station 300 by the first base station 100, the transmission unit 21 transmits part or all of data remaining in the second base station 200 (hereinafter, referred to as remaining data) to the third base station 300.

Note that remaining data may be, for example, downlink user data received from the first base station 100 by the second base station 200, or may be uplink user data received from the terminal device 400 by the second base station 200. In addition, remaining data may be user data, or may be a control signal. In addition, user data may be a PDCP PDU, or may be various kinds of other data.

Note that the transmission unit 21 may transmit remaining data to the third base station 300 with timing when the second base station 200 knows that the first base station 100 changes a base station for the terminal device 400 from the second base station 200 to the third base station 300. Specifically, the transmission unit 21 may transmit remaining data to the third base station 300 when, for example, the second base station 200 receives a message such as an SeNB Release Request message from the first base station 100.

Figure 3:
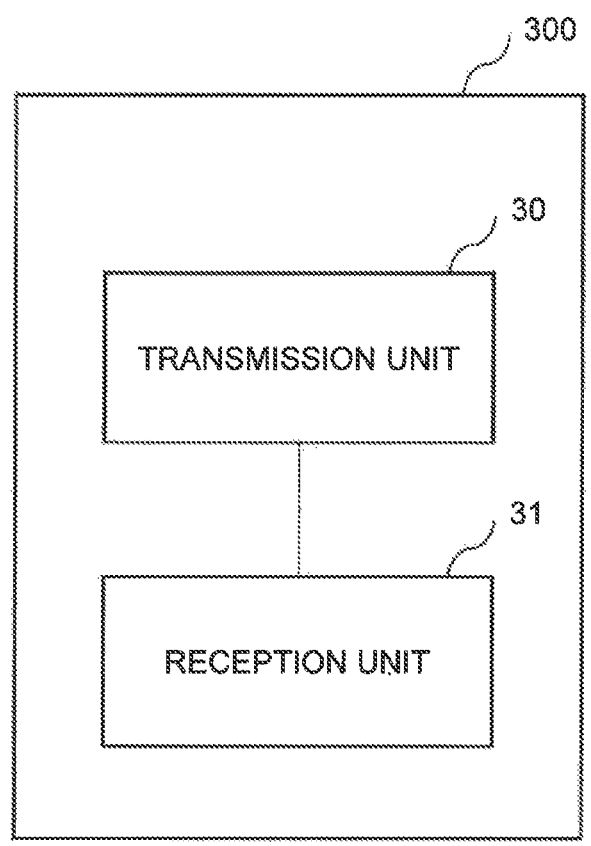
FIG. 3 is a block diagram of a third base station according to the first example embodiment.

FIG. 3 illustrates an example of a configuration of the third base station 300 according to the present example embodiment.

The third base station 300 includes at least a transmission unit 30 and a reception unit 31.

The transmission unit 30 can transmit downlink user data received by the reception unit 31 to the terminal device 400.

The reception unit 31 receives, from the first base station 100, all or part of downlink user data received from the core network 500 by the first base station 100. In addition, when a base station for the terminal device 400 is changed from the second base station 200 to the third base station 300 by the first base station 100, the reception unit 31 receives remaining data from the second base station 200.

Figure 4:
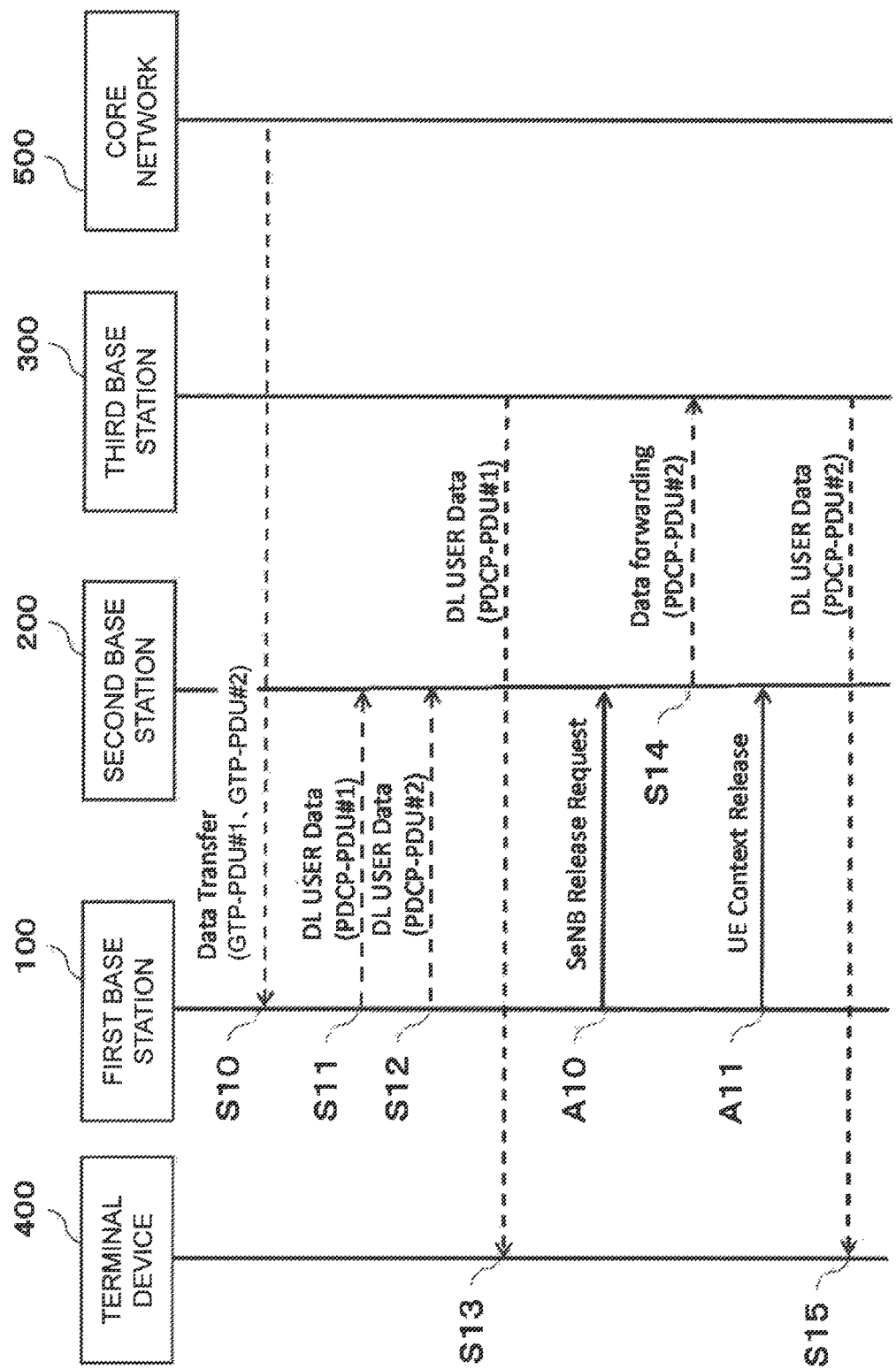
FIG. 4 is a sequence diagram illustrating an example of operation of the communication system according to the first example embodiment.

Next, operation of the communication system according to the present example embodiment will be described using FIG. 4. FIG. 4 illustrates, as an example, operation of the communication system in which the second base station 200 transmits downlink user data (also referred to as DL USER Data: Down Link USER Data) to the third base station 300.

At Step S10, the core network 500 transmits downlink user data (GTP-PDU#1 and GTP-PDU#2) (GTP-PDU: GPRS Tunneling Protocol-Protocol Data Unit) to the first base station 100. Note that the downlink user data to be transmitted to the first base station 100 by the core network 500 are GTP-PDU.

At Steps S11 and S12, the first base station 100 transmits, to the second base station 200, downlink user data received from the core network 500. Note that the downlink user data to be transmitted to the second base station 200 by the first base station 100 are PDCP-PDU.

At Step S13, the third base station 300 transmits, to the terminal device 400, downlink user data (PDCP-PDU#1) with SN (Sequence Number) 1 among downlink user data received from the first base station 100.

At Step A10, the first base station 100 transmits an SeNB Release Request message to the second base station 200. At this point of time, the second base station 200 has not transmitted PDCP-PDU#2 to the terminal device 400. In other words, PDCP-PDU#2 is remaining within a buffer of the second base station 200. Thus, remaining data are PDCP-PDU#2.

At Step S14, the second base station 200 transmits the remaining data (PCDP-PDU#2) to the third base station 300.

At Step A11, the first base station 100 transmits a UE Context Release message to the second base station 200.

At Step S15, the third base station 300 transmits data (PDCP-PDU#2) with SN 2 to the terminal device 400. Note that order of Step A11 and Step S15 may be reversed. In addition, order of Step S14 and Step A11 may be reversed.

Figure 5:
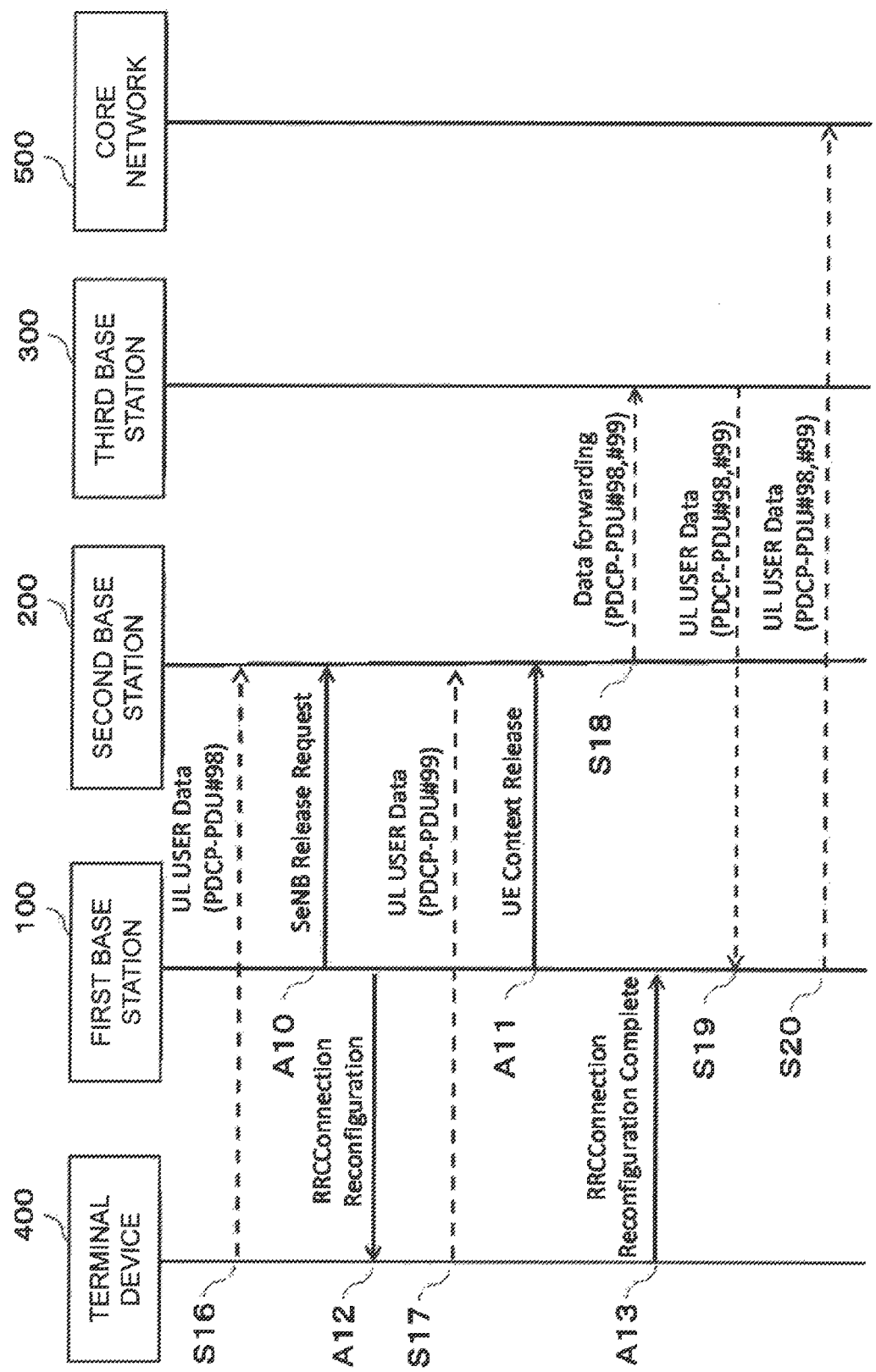
FIG. 5 is a sequence diagram illustrating an example of operation of the communication system according to the first example embodiment.

Next, operation of the communication system according to the present example embodiment will be described using FIG. 5. FIG. 5 illustrates, as an example, operation of the communication system in which the second base station 200 transmits uplink user data (also referred to as UL USER Data: Up Link USER Data) to the third base station 300.

At Step S16, the terminal device 400 transmits uplink user data (PDCP-PDU#98) to the second base station 200.

Step A10 is the same as Step A10 in FIG. 4.

At Step A12, the first base station 100 transmits an RRC Connection Reconfiguration message to the terminal device 400.

At Step S17, the terminal device 400 transmits uplink user data (PDCP-PDU#99) to the second base station 200.

Step A11 is the same as Step A11 in FIG. 4.

Immediately before the second base station 200 performs an operation of Step S18, the second base station 200 has not transmitted PDCP-PDU#98 and PDCP-PDU#99 to the first base station 100. In other words, both PDCP-PDUs are remaining within a buffer of the second base station 200. Thus, PDCP-PDU#98 and PDCP-PDU#99 are remaining data. At Step S18, the second base station 200 transmits remaining data (PDCP-PDU#98 and PDCP-PDU#99) to the third base station 300.

At Step A13, the terminal device 400 transmits an RRC Connection Reconfiguration Complete message to the first base station 100.

At Step S19, the third base station 300 transmits, to the first base station 100, uplink user data (PDCP-PDU#98 and PDCP-PDU#99) received from the second base station 200.

At Step S20, the first base station 100 transmits, to the core network 500, uplink user data (PDCP-PDU#98 and PDCP-PDU#99) received from the third base station 300.

Note that, when there are uplink user data received from the terminal device 400 by the second base station 200 between Step A11 and Step S13, the second base station 200 may transmit the uplink user data to the third base station 300 at Step S18. In addition, Step S18 only needs to be performed after Step A10. Thus, for example, order of Step S18 and Step A11 may be reversed.

Figure 6:
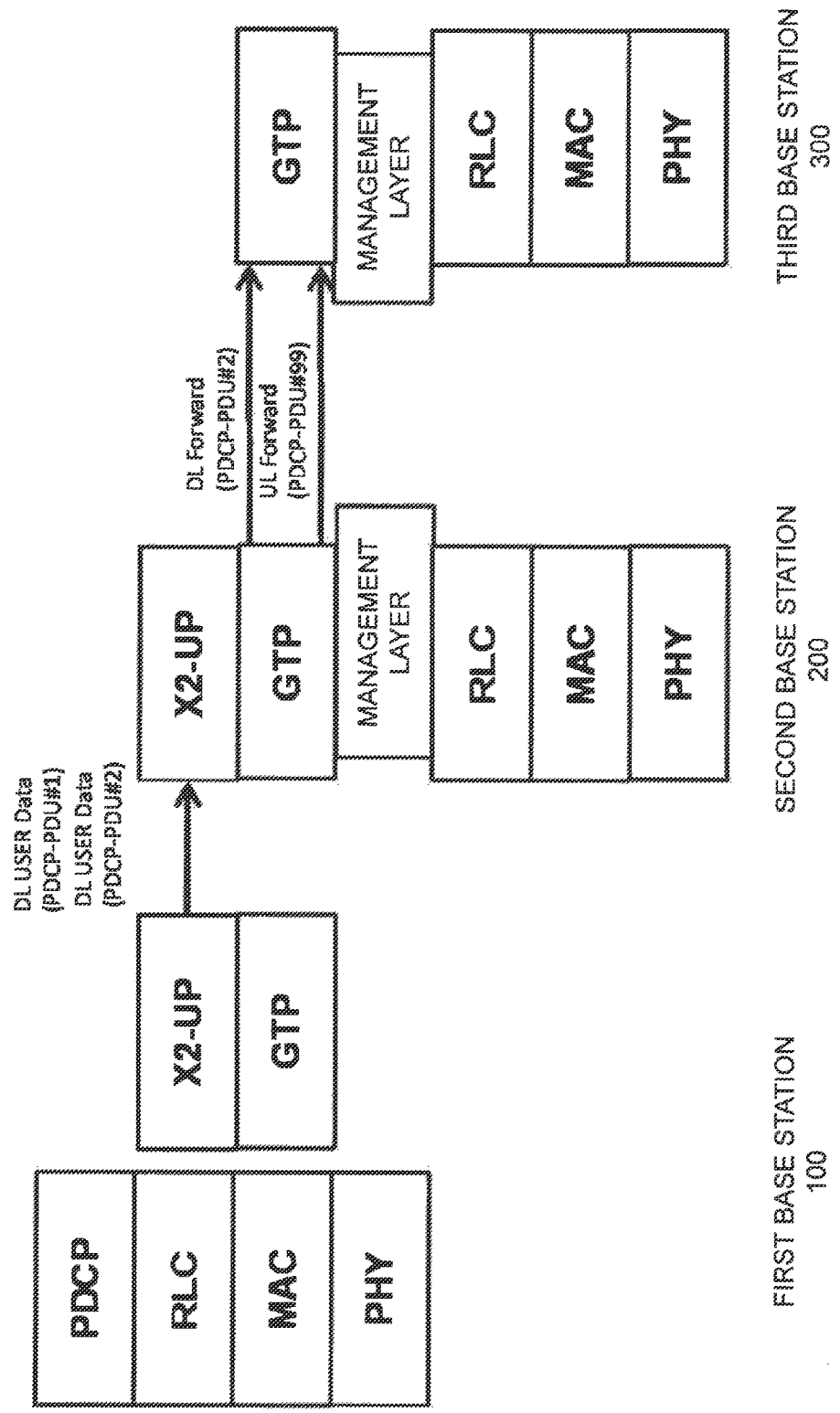
FIG. 6 is an example of architecture of the communication system according to the first example embodiment.

Note that the second base station 200 may transmit remaining data to the third base station 300 by using a GTP layer. Specifically, the second base station 200 transmits remaining data from a GTP layer of the second base station 200 to a GTP layer of the third base station 300. FIG. 6 illustrates architecture of the communication system in this case.

Referring to FIG. 6, the first base station 100 includes at least a PDCP layer, an RLC (Radio Link Control) layer, a MAC (Medium Access Control) layer, a PHY (Physical) layer, an X2-UP (X2-User Plane) layer, and a GTP layer. In addition, the second base station 200 includes at least an X2-UP layer, a GTP layer, a management layer, an RLC layer, a MAC layer, and a PHY layer. In addition, the third base station 300 includes at least a GTP layer, a management layer, an RLC layer, a MAC layer, and a PHY layer.

When the first base station 100 transmits downlink user data (for example, PDCP-PDU#1 and PDCP-PDU#2) to the second base station 200, an X2-UP layer is used for transmitting the downlink user data.

On the other hand, when the second base station 200 transmits downlink user data (for example, PDCP-PDU#2) and/or uplink user data (for example, PDCP-PDU#99) to the third base station 300, the second base station 200 transmits the downlink user data and/or the uplink user data to the third base station 300 by using a GTP layer.

As described above, when the second base station 200 transmits remaining data to the third base station 300 by using a GTP layer, the present example embodiment can be carried out without adding any modifications to the architecture prescribed in the 3GPP standards specifications existing at the time of filing the present application.

Figure 7:
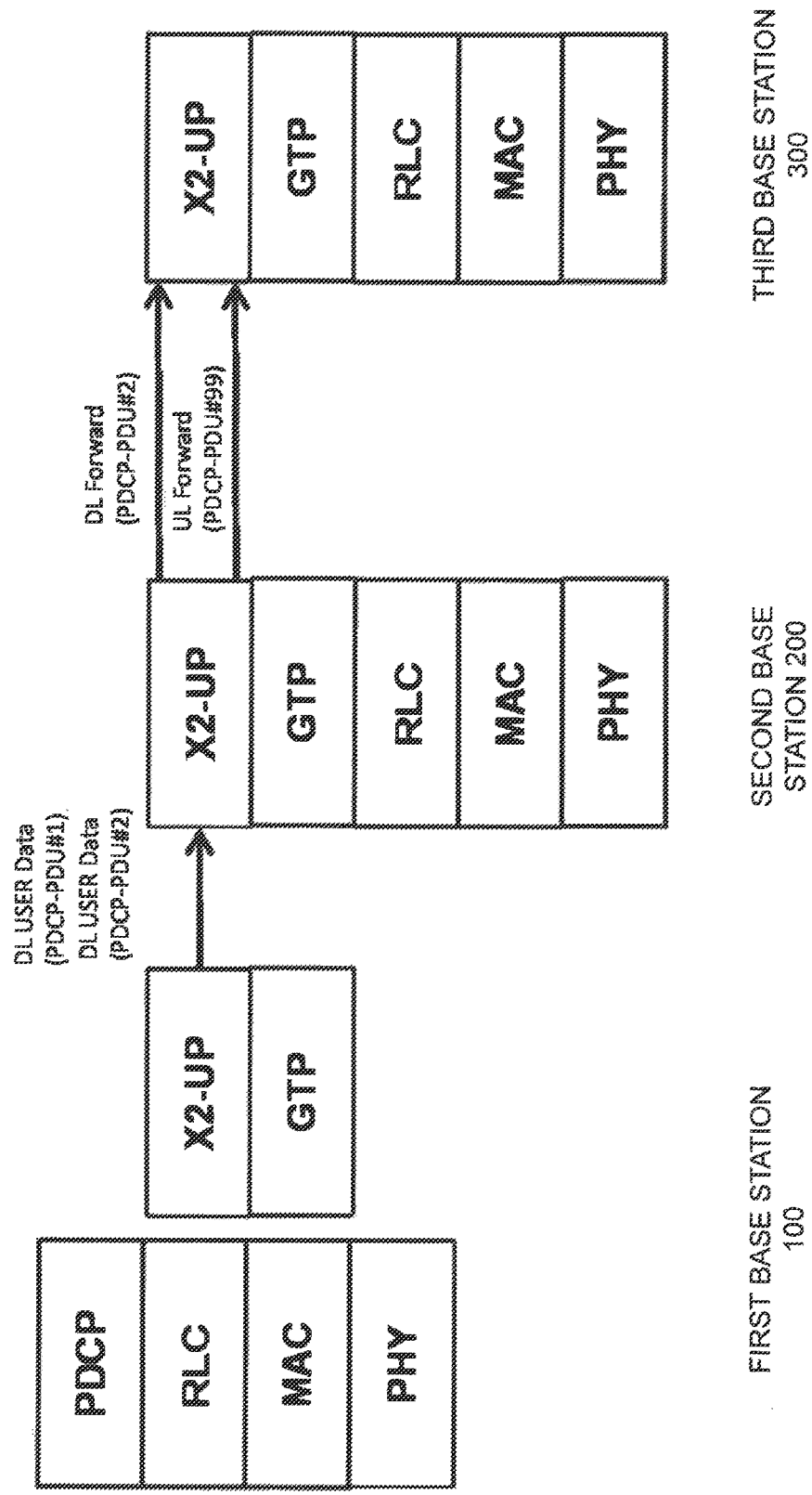
FIG. 7 is an example of architecture of the communication system according to the first example embodiment.

In addition, the second base station 200 may transmit remaining data to the third base station 300 by using an X2-UP layer. Specifically, the second base station 200 transmits remaining data from an X2-UP layer of the second base station 200 to an X2-UP layer of the third base station 300. FIG. 7 illustrates architecture of the communication system in this case.

Referring to FIG. 7, the first base station 100 includes at least a PDCP layer, an RLC layer, a MAC layer, a PHY layer, an X2-UP layer, and a GTP layer. In addition, the second base station 200 includes at least an X2-UP layer, a GTP layer, an RLC layer, a MAC layer, and a PHY layer. In addition, the third base station 300 includes at least an X2-UP layer, a GTP layer, an RLC layer, a MAC layer, and a PHY layer.

When the first base station 100 transmits downlink user data (for example, PDCP-PDU#1 and PDCP-PDU#2) to the second base station 200, an X2-UP layer is used for transmitting the downlink user data.

Further, when the second base station 200 transmits downlink user data (for example, PDCP-PDU#2) and/or uplink user data (for example, PDCP-PDU#99) to the third base station 300, the second base station 200 transmits the downlink user data and/or the uplink user data to the third base station 300 by using an X2-UP layer.

As described above, the second base station 200 can also transmit remaining data to the third base station 300 by using an X2-UP layer.

Note that, in the example embodiment described above, the terminal device 400 is an only terminal device that communicates with the first base station 100 and the second base station 200, but the above-described example embodiment is not limited to the present configuration. An example of a case in which there are a plurality of terminal devices that communicate with the first base station 100 and the second base station 200 will be described next.

For example, when the terminal device 400 and a terminal device 405 are two terminal devices that communicate with the first base station 100 and the second base station 200, the communication system includes a base station (a base station for the terminal device 400) for transmitting, to the terminal device 400, all or part of downlink user data received from the core network 500 by the first base station 100, and a base station (hereinafter, referred to as a base station for the terminal device 405) for transmitting, to the terminal device 405, all or part of downlink user data received from the core network 500 by the first base station 100. One base station may serve as a base station for the terminal device 400 and a base station for the terminal device 405. Specifically, for example, the second base station 200 may serve as a base station for the terminal device 400 and as a base station for the terminal device 405.

When the first base station 100 changes only a base station for the terminal device 400 from the second base station 200 to the third base station 300, the second base station 200 transmits, to the third base station 300, uplink user data received from the terminal device 400 by the second base station 200, and downlink user data for the terminal device 400 received from the first base station 100 by the second base station 200. In other words, remaining data to be transmitted to the third base station 300 by the second base station 200 are uplink user data received from the terminal device 400 by the second base station 200, and downlink user data for the terminal device 400 received from the first base station 100 by the second base station 200.

Note that the first base station 100 may notify the second base station 200 of an address (hereinafter, referred to as address information) that indicates to which base station the second base station 200 is to transmit part or all of remaining data. Address information may include either one or both of information indicating the first base station 100 and information indicating the third base station 300.

The second base station 200 having received address information from the first base station 100 may determine, based on the address information, a base station of a transmission destination to which part or all of remaining data are transmitted. When the address information received from the first base station 100 includes both information indicating the third base station 300 and information indicating the first base station, the second base station 200 may transmit remaining data to either one of the base stations, or may transmit remaining data to both the base stations. In addition, when there is a problem in data transmission and reception between the second base station 200 and the first base station 100, or between the second base station 200 and the third base station 300 for some reason, the second base station 200 may transmit remaining data by using a route in which the problem is not occurring. In addition, even when the address information received from the first base station 100 includes both information indicating the third base station 300 and information indicating the first base station, the second base station 200 may transmit remaining data to the third base station 300 via the first base station 100 when the second base station 200 and the third base station 300 do not have an X2 Interface.

Note that, when the present example embodiment is applied to Dual Connectivity, the first base station 100, the second base station 200, the third base station 300, and the core network 500, which are the devices in the communication system illustrated in FIG. 1, correspond to an MeNB, an SeNB (may be referred to as a Source SeNB), an SeNB (may be referred to as a Target SeNB), and an S-GW, respectively.

In this way as described above, the communication system according to the present example embodiment enables transmission of data remaining in the second base station 200 from the second base station 200 to the third base station 300, even not necessarily via the first base station 100.

Second Example Embodiment

In the first example embodiment, the second base station 200 transmits remaining data to the third base station 300 without via the first base station 100. Thus, the first base station 100 is unable to know what remaining data are held by the third base station 300. In the present example embodiment, an approach for solving the present problem will be further provided.

A configuration example of a communication system according to the present example embodiment is the same as that in the first example embodiment. Note that, in the present example embodiment, the first base station 100, the second base station 200, the third base station 300, the terminal device 400, and the core network 500 according to the first example embodiment are defined as a first base station 110, a second base station 210, a third base station 310, a terminal device 410, and a core network 510, respectively.

Figure 8:
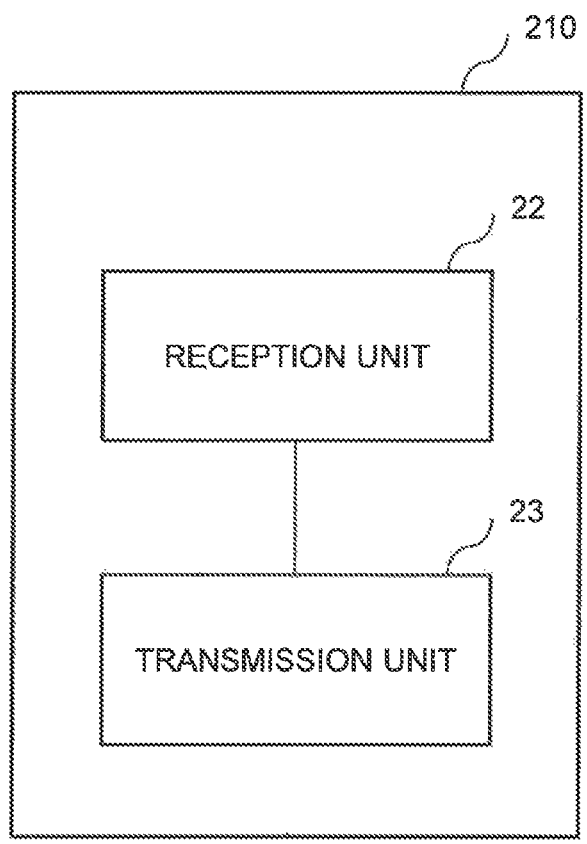
FIG. 8 is a block diagram of a second base station according to a second example embodiment.

FIG. 8 illustrates an example of a configuration of the second base station 210 according to the present example embodiment.

The second base station 210 includes at least a reception unit 22 and a transmission unit 23.

The reception unit 22 receives, from the first base station 110, all or part of downlink user data received from the core network 510 by the first base station 110.

When a base station for transmitting, to the terminal device 410, all or part of downlink user data received from the core network 510 by the first base station 110 (hereinafter, referred to as a base station for the terminal device 410) is changed from the second base station 210 to the third base station 310 by the first base station 110, the transmission unit 23 transmits data remaining in the second base station 210 (hereinafter, referred to as remaining data) to the third base station 310, similarly to the transmission unit 10 according to the first example embodiment. Further, after transmitting the remaining data to the third base station 310, the transmission unit 23 according to the present example embodiment transmits, to the first base station 110, information (hereinafter, referred to as transmission status information) relating to data transmitted to the third base station 310. The transmission status information may be incorporated in, for example, a message such as an SN Status Transfer message. A specific example of the transmission status information will be described later.

FIG. 9 illustrates an example of operation of the communication system according to the present example embodiment. FIG. 9 illustrates, as an example, operation of the communication system in a case in which the second base station 210 transmits downlink user data to the third base station 310.

At Step S10, the core network 510 transmits downlink user data (GTP-PDU#1 and GTP-PDU#2) to the first base station 110. The downlink user data to be transmitted to the first base station 110 by the core network 510 are GTP-PDU.

At Steps S11 and S12, the first base station 110 transmits, to the second base station 210, downlink user data received from the core network 510. The downlink user data to be transmitted to the second base station 210 by the first base station 110 are PDCP-PDU.

At Step S13, the third base station 310 transmits, to the terminal device 410, downlink user data (PDCP-PDU#1) with SN 1 among downlink user data received from the first base station 110.

At Step A10, the first base station 110 transmits an SeNB Release Request message to the second base station 210. At this point of time, the second base station 210 has not transmitted PDCP-PDU#2 to the terminal device 410. In other words, PDCP-PCU#2 is remaining within a buffer of the second base station 210. Thus, remaining data are PDCP-PCU#2.

At Step A12, the first base station 110 transmits an RRC Connection Reconfiguration message to the terminal device 410.

At Step A13, the terminal device 410 transmits an RRC Connection Reconfigurion Complete message to the first base station 110.

At Step S14, the second base station 210 transmits the remaining data (PCDP-PCU#2) to the third base station 310.

At Step A14, the second base station 210 transmits an SN Status Transfer message to the first base station 110. The SN Status Transfer message includes transmission status information.

At Step A15, the first base station 110 transmits a UE Context Release message to the second base station 210.

At Step S15, the third base station 310 transmits downlink user data (PDCP-PDU#2) with SN 2 to the terminal device 410. Note that Step A15 only needs to be performed between Step S14 and Step A15. In addition, Step S15 needs to be performed after Step S14.

Note that, when the second base station 210 transmits remaining data to the third base station 300 by using a GTP layer, transmission status information may be included in an SN Status Transfer message. FIG. 10 illustrates an example in which transmission status information when remaining data are downlink user data is included in an SN Status Transfer message. Note that the transmission status information is Forwarded Status Of DL PDCP PDUs and DL COUNT Value in FIG. 10 in a case other than 15 bit long PDCP-SN. On the other hand, the transmission status information is Forwarded Status Of DL PDCP PDUs Extended and DL COUNT Value Extended in FIG. 10 in the case of 15 bit long PDCP-SN. Each information element indicated in FIG. 10 has a meaning to be described later.

E-RAB ID is information for identifying E-RAB.

Forwarded Status Of DL PDCP PDUs is information indicating whether a PDCP PDU with each SN has been forwarded or not. Specifically, when Forwarded Status Of DL PDCP PDUs is 0, Forwarded Status Of DL PDCP PDUs indicates that a PDCP PDU having a corresponding SN has not been forwarded (PDCP PDU has not been forwarded). In addition, when Forwarded Status Of DL PDCP PDUs is 1, Forwarded Status Of DL PDCP PDUs indicates that a PDCP PDU having a corresponding SN has been forwarded (PDCP PDU has been forwarded correctly). Note that an SN corresponding to Forwarded Status Of DL PDCP PDUs indicating 0 or 1 is an SN that is represented by a number obtained by adding a bit Position to a First Forwarded PDU Number.

DL COUNT Value indicates PDCP-SN and HFN (Hyper Frame Number) of a first forwarded DL PDU.

Forwarded Status Of DL PDCP PDUs Extended is the same information as Forwarded Status Of DL PDCP PDUs. Forwarded Status Of DL PDCP PDUs Extended is information used in the case of 15 bit long PDCP-SN.

DL COUNT Value Extended is the same information as DL COUNT Value. DL COUNT Value Extended is information used in the case of 15 bit long PDCP-SN.

Next, FIG. 11 illustrates an example in which transmission status information when remaining data are uplink user data is included in an SN Status Transfer message. Note that the transmission status information is Forwarded Status Of UL PDCP PDUs and UL COUNT Value in FIG. 11 in the case other than 15 bit long PDCP-SN. On the other hand, the transmission status information is Forwarded Status Of UL PDCP PDUs Extended and UL COUNT Value Extended in FIG. 11 in the case of 15 bit long PDCP-SN. Each information element indicated in FIG. 11 has a meaning to be described later.

Forwarded Status Of UL PDCP PDUs is information indicating whether a PDCP PDU with each SN has been forwarded or not. Forwarded Status Of UL PDCP PDUs, which is the same information element as Forwarded Status Of DL PDCP PDUs, is different in that the former (Forwarded Status Of UL PDCP PDUs) is information relating to UL PDCP PDUs, whereas the latter (Forwarded Status Of DL PDCP PDUs) is information relating to DL PDCP PDUs.

UL COUNT Value indicates PDCP-SN and HFN (Hyper Frame Number) of a first forwarded UL PDU.

Forwarded Status Of UL PDCP PDUs Extended is the same information as Forwarded Status Of UL PDCP PDUs. Forwarded Status Of UL PDCP PDUs Extended is information used in the case of 15 bit long PDCP-SN.

UL COUNT Value Extended is the same information as UL COUNT Value. UL COUNT Value Extended is information used in the case of 15 bit long PDCP-SN.

In addition, when the second base station 210 transmits data to the third base station 300 by using an X2-UP layer, transmission status information may be included in an SN Status Transfer message. FIG. 12 illustrates an example in which transmission status information when remaining data are downlink user data is included in an SN Status Transfer message. Note that the transmission status information is Forwarded Status Of DL PDCP PDUs and DL X2-UP SN in FIG. 12.

DL X2-UP SN indicates X2-UP SN of a first forwarded DL PDU.

FIG. 13 illustrates an example in which transmission status information when remaining data are uplink user data is included in an SN Status Transfer message. Note that the transmission status information is Forwarded Status Of UL PDCP PDUs and UL X2-UP SN in FIG. 13.

UL X2-UP SN indicates X2-UP SN of a first forwarded UL PDU.

In addition, when the second base station 210 transmits data to the third base station 300 by using an X2-UP layer, transmission status information may be included in a Forwarding Status frame. FIG. 14 illustrates an example in which transmission status information when remaining data are downlink user data is included in a Forwarding Status frame. Each information element illustrated in FIG. 14 has a meaning to be described later. Note that the transmission status information is First forwarded DL X2-U Sequence Number and DL X2-U Sequence Number bitmap in FIG. 14.

First forwarded DL X2-U Sequence Number indicates a first X2-U sequence number.

DL X2-U Sequence Number bitmap indicates a forwarded status of the PDU. Specifically, when DL X2-U Sequence Number bitmap is 0, DL X2-U Sequence Number bitmap indicates that a PDCP PDU having a corresponding SN has not been forwarded (PDCP PDU has not been forwarded). In addition, when DL X2-U Sequence Number bitmap is 1, DL X2-U Sequence Number bitmap indicates that a PDCP PDU having a corresponding SN has been forwarded (PDCP PDU has been forwarded correctly).

FIG. 15 illustrates an example in which transmission status information when remaining data are uplink user data is included in a Forwarding Status frame. Each information element illustrated in FIG. 15 has a meaning to be described later. Note that the transmission status information is First forwarded UL X2-U Sequence Number and UL X2-U Sequence Number bitmap in FIG. 15.

First forwarded UL X2-U Sequence Number indicates a first X2-U sequence number.

UL X2-U Sequence Number bitmap indicates a forwarded status of the PDU. Specifically, when UL X2-U Sequence Number bitmap is 0, UL X2-U Sequence Number bitmap indicates that a PDCP PDU having a corresponding SN has not been forwarded (PDCP PDU has not been forwarded). In addition, when UL X2-U Sequence Number bitmap is 1, UL X2-U Sequence Number bitmap indicates that a PDCP PDU having a corresponding SN has been forwarded (PDCP PDU has been forwarded correctly).

Note that, when remaining data include both uplink user data and downlink user data, transmission status information of uplink user data and transmission status information of downlink user data may be incorporated in one Forwarding Status frame. FIG. 16 illustrates a Forwarding Status frame in this case.

In the communication system according to the example embodiment described above, the first base station 110 is able to know what remaining data are held by the third base station 310.

Third Example Embodiment

In the second example embodiment, the second base station 210 transmits, to the first base station 110, information relating to data transmitted to the third base station 310 from the second base station 210. However, there is also a case in which a link between the first base station 110 and the second base station 210 is already interrupted when the second base station 210 attempts to transmit the information to the first base station 110. In the present example embodiment, an approach for solving the present problem will be further provided.

Note that a link between the first base station 110 and the second base station 210 is set for each terminal device. When a link for the terminal device 410 is extended between the first base station 110 and the second base station 210, the first base station 110 and the second base station 210 are able to transmit and receive various kinds of information for the terminal device 410 by using the link.

A configuration example of a communication system according to the present example embodiment, and a configuration of each device are the same as in the second example embodiment.

Operation of the communication system according to the present example embodiment will be described using FIG.

Figure 17:
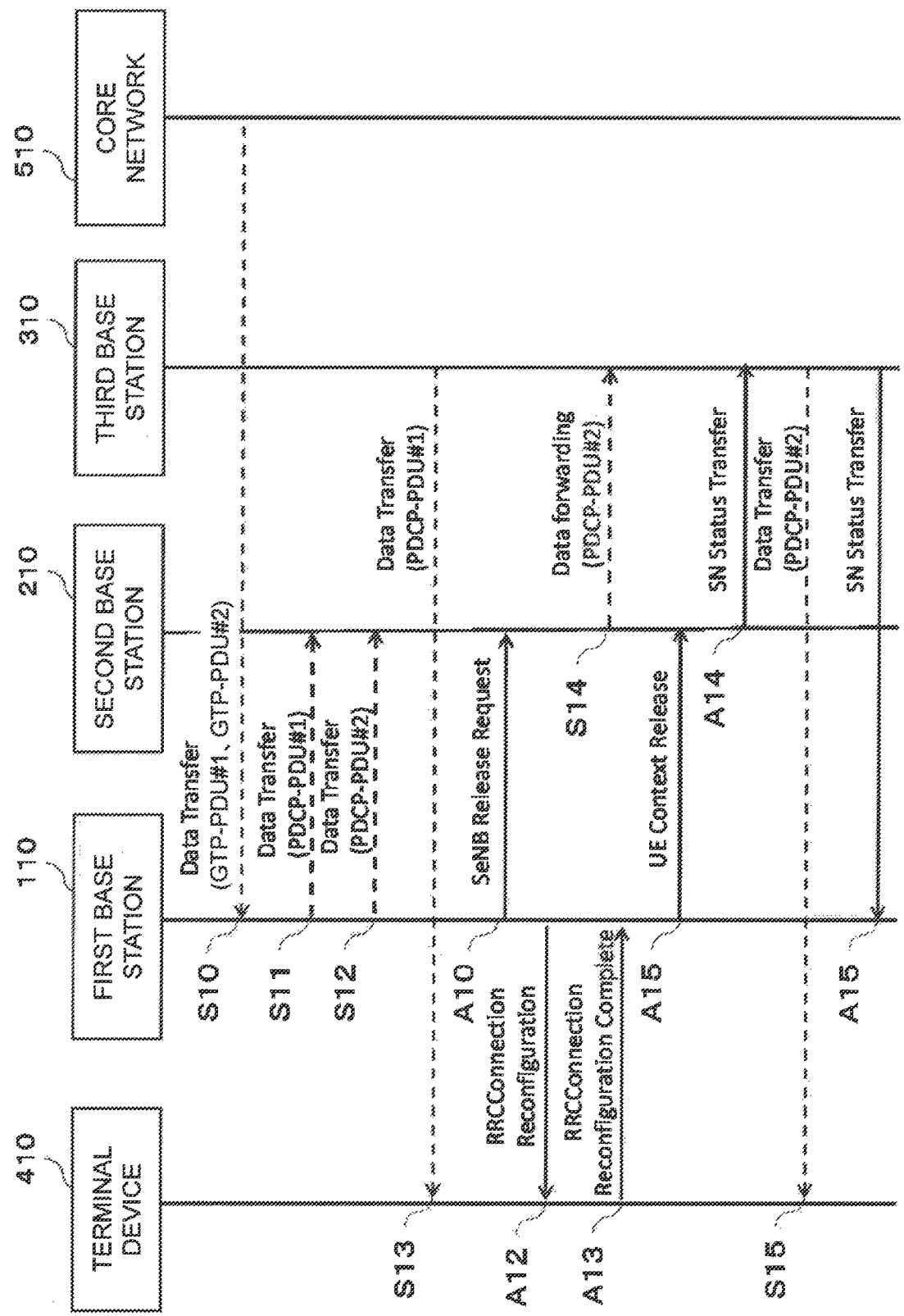
FIG. 17 is a sequence diagram illustrating an example of operation of a communication system according to a third example embodiment.
Figure 18:
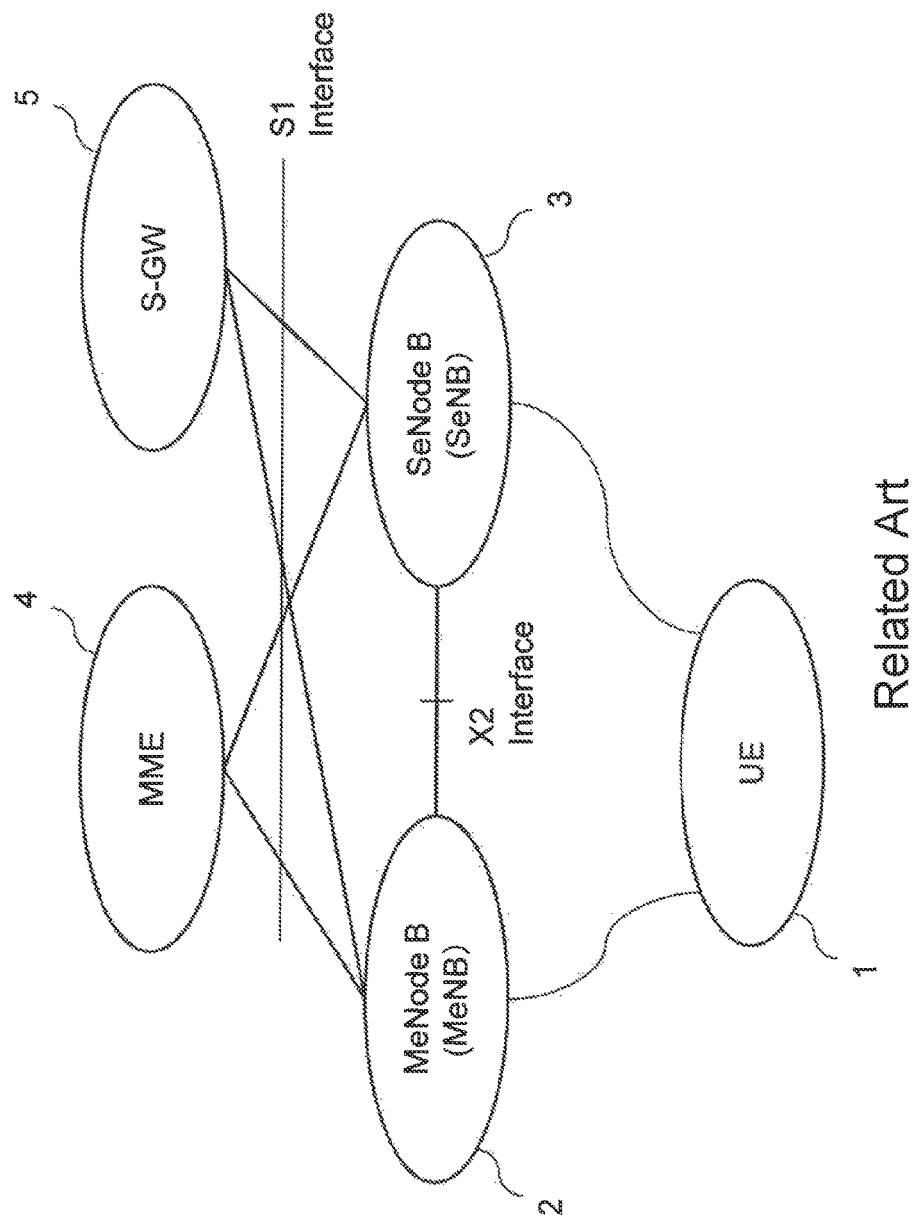
FIG. 18 is an example of a configuration of a wireless communication system implementing Dual Connectivity.
Figure 19:
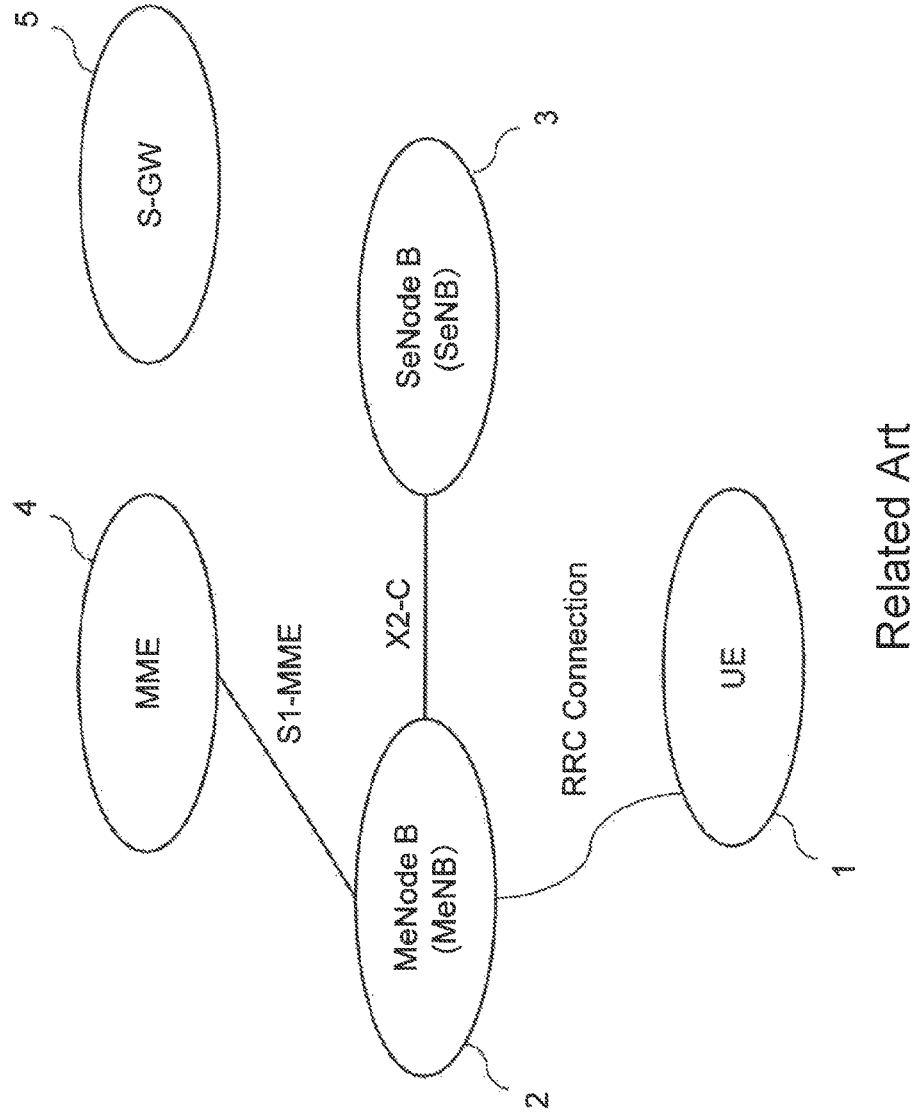
FIG. 19 is an example of a C-plane connection configuration in Dual Connectivity.
Figure 20:
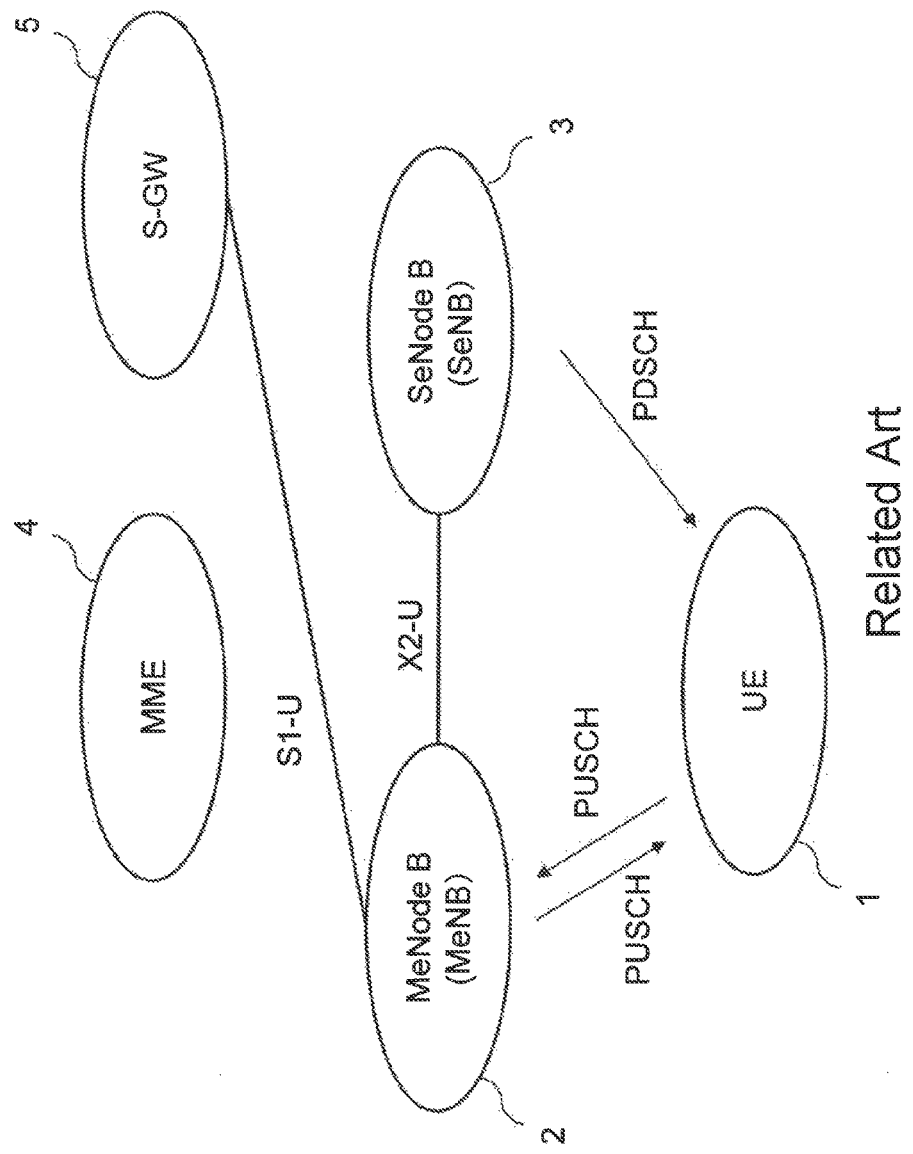
FIG. 20 is an example of a U-plane connection configuration for a Split bearer option configuration.
Figure 21:
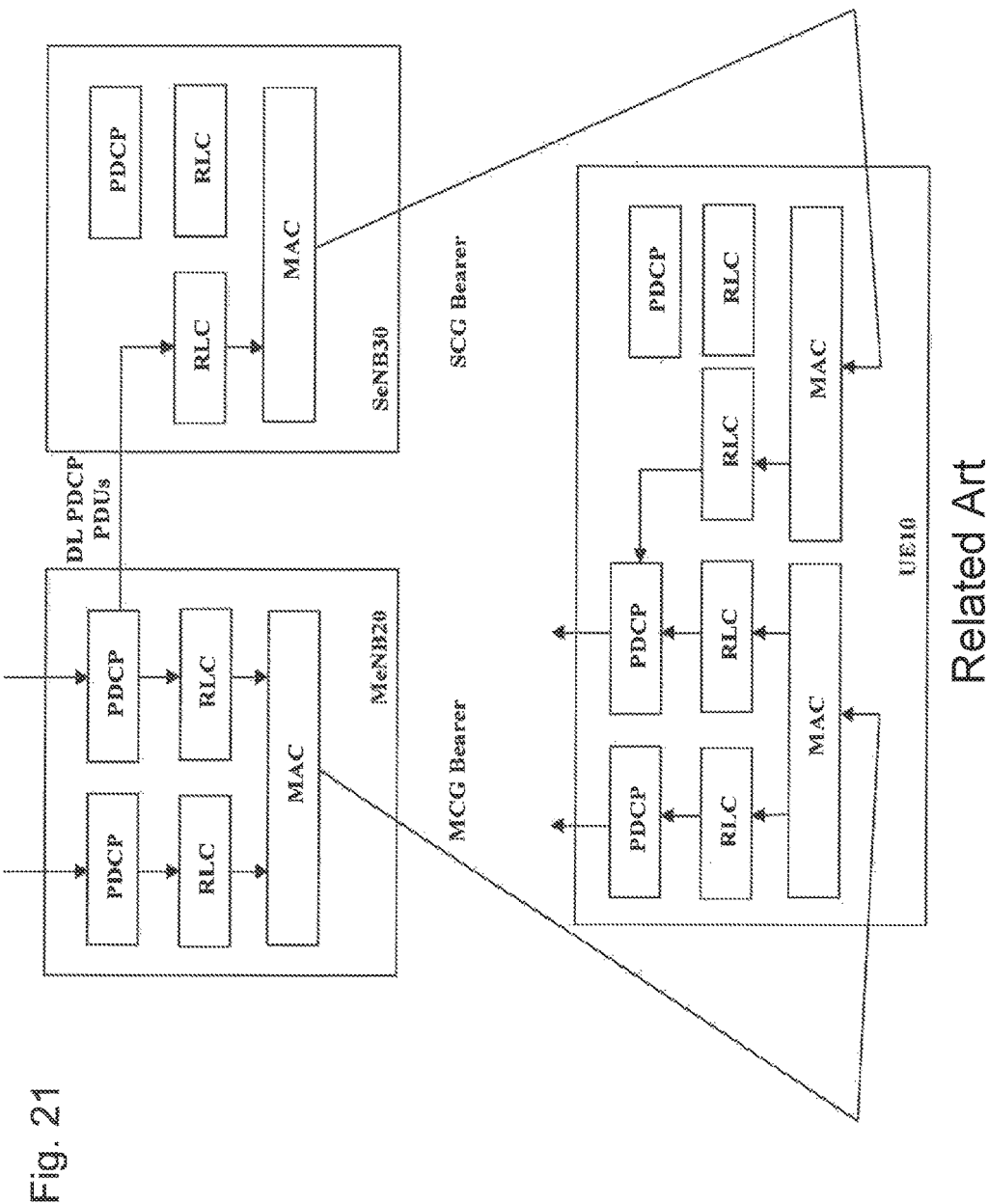
FIG. 21 is an example of a Radio Protocol connection configuration for a Split bearer option configuration.

17. FIG. 17 illustrates, as an example, operation of the communication system in which the second base station 210 transmits downlink user data to the third base station 310.

Steps S10 to S14, and Steps A10 to A13 are the same as the operation described in the second example embodiment.

At Step A15, the first base station 110 transmits a UE Context Release message to the second base station 210.

Step A14 is the same as the operation described in the second example embodiment.

At Step S15, the third base station 310 transmits data (PDCP-PDU#2) with SN 2 to the terminal device 410. Note that order of Step A14 and Step S15 may be reversed.

At Step A15, the third base station 310 transmits an SN Status Transfer message to the first base station 110. Note that the SN Status Transfer message includes transmission status information.

Note that, when the second base station 210 transmits data to the third base station 300 by using a GTP layer, transmission status information may be included in an SN Status Transfer message. An example in which transmission status information is included in an SN Status Transfer message is as in FIGS. 10 and 11.

In addition, when the second base station 210 transmits data to the third base station 300 by using an X2-UP layer, transmission status information may be included in an SN Status Transfer message. An example in which transmission status information is included in an SN Status Transfer message is as in FIGS. 12 and 13.

In addition, when the second base station 210 transmits data to the third base station 300 by using an X2-UP layer, transmission status information may be included in a Forwarding Status frame. An example in which transmission status information is included in a Forwarding Status frame is as in FIGS. 14, 15, and 16.

In the communication system according to the example embodiment described above, even when there is no link between the first base station 110 and the second base station 210, the second base station 210 is able to transmit transmission status information to the first base station 110 via the third base station 310.

Note that, in the example embodiment described above, the operation of the present example embodiment has been described using an example of the case in which the Split bearer option configuration is used as a U-plane connection configuration in Dual Connectivity. However, the present example embodiment can be also applied to a case in which the SCG bearer option configuration is used as a U-plane connection configuration in Dual Connectivity. When the SCG bearer option configuration is used, the second base station 210 and the third base station 310 are different from the above-described example embodiment in each being connected with a core network. However, operation of the second base station 210 and the third base station 310 is the same as that in the above-described example embodiment.

Figure 22:
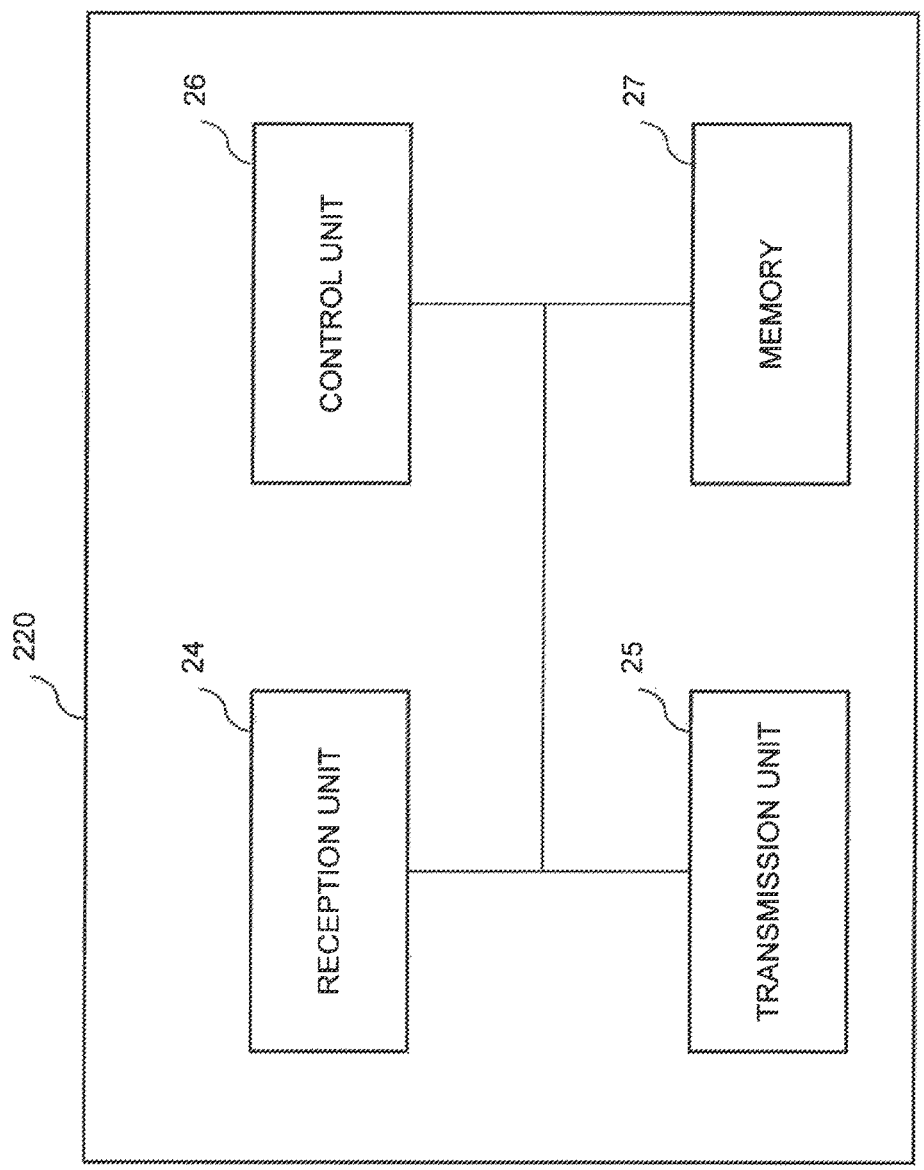
FIG. 22 is a block diagram of a second base station.

Note that the second base station 200 or 210 according to each of the example embodiments described above may include a configuration other than the configuration illustrated in FIG. 2 or 8. FIG. 22 illustrates a configuration of a second base station 220 that is a modification example of the second base station 200 or 210 according to each of the example embodiments described above.

The second base station 220 includes at least a reception unit 24, a transmission unit 25, a control unit 26, and a memory 27.

The reception unit 24 is the same as the reception unit 20 or the reception unit 22.

The transmission unit 25 is the same as the transmission unit 21 or the transmission unit 23.

The control unit 26 controls a configuration unit that is included in the second base station 220. The control unit 26 may control, for example, a transmission address and the like, and may change a destination to which the transmission unit 25 transmits information.

The memory 27 stores various kinds of data received from a first base station by the second base station 220, and various kinds of data received from a terminal device by the second base station 220.

Note that a term "transmit" used in the present description, drawings, and claims may indicate "forward" at different times.

Each processing of the example embodiments described above may be executed by software. In other words, a computer program for performing each processing may be read and executed by a CPU included in an information processing device. Even when each processing is performed using a program, processing of the same content as the processing in the example embodiments described above can be performed. Then, the above-described program may be stored in a semiconductor storage device such as a ROM (Read Only Memory), a RAM (Random Access Memory), and a flash memory, and a non-transitory medium such as an optical disk, a magnetic disk, and a magneto-optical disk.

The whole or part of the example embodiments disclosed above can be described as, but not limited to, the following supplementary notes.

(Supplementary Note 1)

A base station in a communication system that includes a master cell base station, a secondary cell base station, a core network, and a terminal device, the base station comprising:
a reception unit that receives, from the master cell base station, downlink user data received from the core network by the master cell base station; and
a transmission unit that transmits, to the terminal device, downlink user data received by the reception unit, wherein
the reception unit receives, from the master cell base station, switching information indicating that a base station from which the master cell base station receives downlink user data is switched, and
the transmission unit transmits remaining data to the secondary cell base station when the reception unit receives the switching information.

(Supplementary Note 2)

The base station according to Supplementary note 1, wherein the remaining data are downlink packet data received from the master cell base station.

(Supplementary Note 3)

The base station according to Supplementary note 1 or 2, wherein the remaining data are uplink packet data received from the terminal device.

(Supplementary Note 4)

The base station according to any one of Supplementary notes 1 to 3, wherein
the transmission unit transmits the remaining data to the secondary cell base station when there is a trouble in a line with the master cell base station.

(Supplementary Note 5)

The base station according to any one of Supplementary notes 1 to 4, wherein
the transmission unit transmits, to the master cell base station, first information relating to data transmitted to the secondary cell base station after transmitting the remaining data to the secondary cell base station.

(Supplementary Note 6)

The base station according to any one of Supplementary notes 1 to 5, wherein

The transmission unit transmits, to the secondary cell base station, first information relating to data transmitted to the secondary cell base station after transmitting the remaining data to the secondary cell base station.

(Supplementary Note 7)

The base station according to any one of Supplementary notes 1 to 6, wherein the transmission unit transmits, on an X2-UP layer, the remaining data to the secondary cell base station.

(Supplementary Note 8)

The base station according to Supplementary note 7, wherein the first information is included in a Forwarding Status frame.

(Supplementary Note 9)

The base station according to any one of Supplementary notes 1 to 6, wherein the transmission unit transmits, on a GTP layer, the remaining data to the secondary cell base station.

(Supplementary Note 10)

The base station according to Supplementary note 9, wherein the first information is included in an SN Status Transfer message.

(Supplementary Note 11)

A method of a base station in a communication system that includes a master cell base station, a secondary cell base station, a core network, and a terminal device, the method comprising:

a step of receiving, from the master cell base station, downlink user data received from the core network by the master cell base station; and a step of transmitting, to the terminal device, downlink user data received by the reception unit, wherein the reception unit receives, from the master cell base station, switching information indicating that a base station from which the master cell base station receives downlink user data is switched, and the transmission unit transmits remaining data to the secondary cell base station when the reception unit receives the switching information.

(Supplementary Note 12)

A base station in a communication system that includes a master cell base station, a secondary cell base station, a core network, and a terminal device, the base station comprising:

a reception unit that receives, from the master cell base station, downlink user data received from the core network by the master cell base station; and a transmission unit that transmits, to the terminal device, downlink user data received by the reception unit, wherein the reception unit receives data remaining in the secondary cell base station from the secondary cell base station.

REFERENCE SIGNS LIST

1 UE
2 MeNodeB
3 SeNodeB
4 MME
5 S-GW
20, 22, 24, 31 Reception unit
21, 23, 25, 30 Transmission unit
26 Control unit
27 Memory
100, 110 First base station
200, 210, 220 Second base station
300, 310 Third base station
400, 410 Terminal device
500, 510 Core network

The invention claimed is:

1. A first secondary cell base station in a communication system that includes a master cell base station, a second secondary cell base station, a core network, and a terminal device, the first secondary cell base station comprising:

a reception interface configured to receive, from the master cell base station, downlink user data received from the core network by the master cell base station; and a transmission interface configured to transmit, to the terminal device, downlink user data received by the reception interface, wherein the reception interface is further configured to receive, from the master cell base station, switching information indicating that a secondary cell base station for transmitting, to the terminal device, downlink user data is changed from the first secondary cell base station to the second secondary cell base station, wherein the transmission interface is further configured to transmit first remaining data to the second secondary cell base station when the reception interface receives the switching information, wherein the first remaining data are downlink packet data received from the master cell base station, and wherein the transmission interface is further configured to transmit, to the master cell base station via the second secondary cell base station, first information relating to data transmitted to the second secondary cell base station after transmitting the first remaining data to the second secondary cell base station, when a link between the first secondary cell base station and the master cell base station is interrupted.

2. The first secondary cell base station according to claim 1, wherein the transmission interface is further configured to transmit the first remaining data to the second secondary cell base station when there is a trouble in a line with the master cell base station.

3. The first secondary cell base station according to claim 1, wherein the transmission interface is further configured to transmit, to the second secondary cell base station, the first information relating to data transmitted to the second secondary cell base station after transmitting the first remaining data to the second secondary cell base station.

4. The first secondary cell base station according to claim 1, wherein the transmission interface is further configured to transmit, on an X2-UP layer, the first remaining data to the second secondary cell base station.

5. The first secondary cell base station according to claim 3, wherein the first information relating to data transmitted to the second secondary cell base station is included in a Forwarding Status frame.

6. The first secondary cell base station according to claim 1, wherein the transmission interface is further configured to transmit, on a GTP layer, the first remaining data to the second secondary cell base station.

7. The first secondary cell base station according to claim 3, wherein the first information relating to data transmitted to the second secondary cell base station is included in an SN Status Transfer message.

8. A method of a first secondary cell base station in a communication system that includes a master cell base station, a second secondary cell base station, a core network, and a terminal device, the method comprising:

receiving, from the master cell base station, downlink user data received from the core network by the master cell base station;

transmitting, to the terminal device, downlink user data;

receiving, from the master cell base station, switching information indicating that a secondary cell base station for transmitting, to the terminal device, downlink user data is changed from the first secondary cell base station to the second secondary cell base station;

transmitting remaining data to the second secondary cell base station when receiving the switching information; and transmitting, to the master cell base station via the second secondary cell base station, first information relating to data transmitted to the second secondary cell base station after transmitting the remaining data to the second secondary cell base station, when a link between the first secondary cell base station and the master cell base station is interrupted.

9. A first secondary cell base station in a communication system that includes a master cell base station, a second secondary cell base station, a core network, and a terminal device, the first secondary cell base station comprising:

a reception interface is configured to receive, from the master cell base station, downlink user data received from the core network by the master cell base station; and a transmission interface is configured to transmit, to the terminal device, downlink user data received by the reception interface, wherein the reception interface is further configured to receive data remaining in the second secondary cell base station from the second secondary cell base station, wherein the reception interface is further configured to receive, from the second secondary cell base station, first information relating to data transmitted from the second secondary cell base station after receiving the data remaining in the second secondary cell base station from the second secondary cell base station, when a link between the second secondary cell base station and the master cell base station is interrupted, and wherein the transmission interface is further configured to transmit, to the master cell base station, the first information.

10. The first secondary cell base station according to claim 1, wherein the reception interface is further configured to receive, from the terminal device, uplink user data, wherein the transmission interface is further configured to transmit, to the master cell base station, the uplink user data, wherein the transmission interface is further configured to transmit second remaining data to the second secondary cell base station when the reception interface receives the switching information, and wherein the second remaining data are uplink packet data received from the terminal device.

\* \* \* \* \*